US008290973B2

(12) United States Patent
Flake et al.

(10) Patent No.: US 8,290,973 B2
(45) Date of Patent: Oct. 16, 2012

(54) DETERMINING INFLUENCERS

(75) Inventors: Gary W. Flake, Bellevue, WA (US); William H. Gates, III, Redmond, WA (US); Alexander G. Gounares, Kirkland, WA (US); W. Daniel Hillis, Encino, CA (US); Royce A. Levien, Lexington, MA (US); Mark A. Malamud, Seattle, WA (US); Craig J. Mundie, Seattle, WA (US); Christopher D. Payne, Seattle, WA (US); Richard F. Rashid, Redmond, WA (US); Clarence T. Tegreene, Bellevue, WA (US); Charles Whitmer, North Bend, WA (US); Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 66 days.

(21) Appl. No.: 12/660,799

(22) Filed: Mar. 3, 2010

(65) Prior Publication Data
US 2010/0318374 A1 Dec. 16, 2010

Related U.S. Application Data

(63) Continuation-in-part of application No. 11/799,460, filed on Apr. 30, 2007, and a continuation-in-part of application No. 11/811,349, filed on Jun. 7, 2007, and a continuation-in-part of application No. 11/799,461, filed on Apr. 30, 2007, and a continuation-in-part of application No. 11/811,402, filed on Jun. 8, 2007, and a continuation-in-part of application No. 11/824,551, filed on Jun. 29, 2007, and a continuation-in-part of application No. 11/824,582, filed on Jun. 29, 2007, and a continuation-in-part of application No. 11/906,537, filed on Oct. 1, 2007, and a continuation-in-part of application No. 11/824,580, filed on Jun. 29, 2007, and a continuation-in-part of application No. 11/881,800, filed on Jul. 27, 2007, and a continuation-in-part of application No. 11/906,780, filed on Oct. 2, 2007, and a continuation-in-part of application No. 12/290,310, filed on Oct. 28, 2008, and a continuation-in-part of application No. 12/290,675, filed on Oct. 31, 2008.

(51) Int. Cl.
*G06F 17/30* (2006.01)
(52) U.S. Cl. ..... 707/758; 707/780; 707/944; 705/14.45; 705/14.53
(58) Field of Classification Search ................. 707/758, 707/780, 944, 999.01, 999.101, 999.107; 705/14.45, 14.53, 26.8
See application file for complete search history.

(56) References Cited

U.S. PATENT DOCUMENTS

| 6,466,918 B1 | 10/2002 | Spiegel et al. |
| 7,031,952 B1 | 4/2006 | Heumann et al. |
| 7,096,214 B1 | 8/2006 | Bharat et al. |

(Continued)

OTHER PUBLICATIONS

U.S. Appl. No. 60/870,926, filed Dec. 20, 2006, Flake et al.

(Continued)

*Primary Examiner* — Leslie Wong

(57) ABSTRACT

The present disclosure relates generally to determining influencers in a Web 2.0 environment. More specifically, in some implementations, an influence of an electronically-accessed content on an involvement between an accessor and a third party is determined. In further implementations, a provider of the electronically accessed content is rewarded based on the assessed influence.

54 Claims, 19 Drawing Sheets

U.S. PATENT DOCUMENTS

| | | | |
|---|---|---|---|
| 7,143,089 B2 | 11/2006 | Petras et al. | |
| 7,516,094 B2 * | 4/2009 | Perkowski | 705/14.73 |
| 7,769,626 B2 * | 8/2010 | Reynolds | 705/7.32 |
| 7,797,204 B2 * | 9/2010 | Balent | 705/28 |
| 7,818,399 B1 * | 10/2010 | Ross et al. | 709/218 |
| 7,933,956 B2 * | 4/2011 | Hon et al. | 709/205 |
| 7,966,369 B1 * | 6/2011 | Briere et al. | 709/204 |
| 7,996,256 B1 * | 8/2011 | Anand et al. | 705/7.31 |
| 8,005,697 B1 * | 8/2011 | Cohen et al. | 705/7.13 |
| 8,013,729 B2 * | 9/2011 | Buehler | 340/506 |
| 2004/0056908 A1 | 3/2004 | Bjornson et al. | |
| 2004/0205065 A1 | 10/2004 | Petras et al. | |
| 2004/0205327 A1 | 10/2004 | Morrison et al. | |
| 2004/0254911 A1 | 12/2004 | Grasso et al. | |
| 2005/0071251 A1 | 3/2005 | Linden et al. | |
| 2005/0102202 A1 | 5/2005 | Linden et al. | |
| 2005/0278297 A1 | 12/2005 | Nelson | |
| 2006/0020662 A1 | 1/2006 | Robinson | |
| 2006/0184558 A1 | 8/2006 | Martin et al. | |
| 2006/0195362 A1 | 8/2006 | Jacobi et al. | |
| 2006/0271425 A1 | 11/2006 | Goodman et al. | |
| 2006/0277108 A1 | 12/2006 | Altberg et al. | |
| 2006/0282304 A1 | 12/2006 | Bedard et al. | |
| 2007/0022079 A1 | 1/2007 | Benson et al. | |
| 2007/0027761 A1 | 2/2007 | Collins et al. | |
| 2007/0067215 A1 | 3/2007 | Agarwal et al. | |
| 2009/0282052 A1 | 11/2009 | Evans et al. | |

OTHER PUBLICATIONS

U.S. Appl. No. 11/881,800, Flake et al.
U.S. Appl. No. 11/824,582, Flake et al.
U.S. Appl. No. 11/824,580, Flake et al.
U.S. Appl. No. 11/824,551, Flake et al.
U.S. Appl. No. 11/811,402, Flake et al.
U.S. Appl. No. 11/811,349, Flake et al.
Abbott, Kelly; "How to Measure Blog Influence"; iMedia Connection; Aug. 16, 2006; pp. 1-3; printed on Mar. 1, 2007; located at http://www.imediaconnection.com/global/5728.asp?ref=http://www.imediaconnection.com/content/10812.asp.
Adomavicius, Gediminas; Tuzhilin, Alexander; "Toward the Next Generation of Recommender Systems: A Survey of the State-of-the-Art and Possible Extensions"; IEEE Transactions on Knowledge and Data Engineering; Jun. 2005; pp. 734-749; vol. 17, No. 6; IEEE Computer Society.
"Archive for Practice"; Recommenders06.com; bearing dates of Oct. 2, 2006, Sep. 13, 2006, Sep. 12, 2006, and 2003-2006; pp. 1-7; printed on Feb. 12, 2007; located at http://blog.recommenders06.com/?cat=11; MediaStrands, Inc.
"Ask Search Technology"; Ask.com; bearing a date of 2007; p. 1; printed on Feb. 13, 2007; located at http://about.ask.com/en/docs/about/ask_technology.shtml.
"Bibliography"; SmartMobs.com; pp. 1-15; printed on Apr. 10, 2007; located at http://www.smartmobs.com/book/book_bib_ch_6_0_30.html.
"Category Lead, Top Reviewer and Advisor FAQ"; Epinions.com; bearing a date of 1999-2007; pp. 1-9; printed on Feb. 12, 2007; located at http://www0.epinions.com/help/faq/show_~faq_recognition; Shopping.com Inc.
"Client (computing)"; Wikipedia.org; bearing a date of Mar. 25, 2007; pp. 1-2; printed on Mar. 29, 2007; located at http://en.wikipedia.org/wiki/Client_(computing); Wikimedia Foundation, Inc.; USA.
"Collaborative filtering"; Wikipedia.org; bearing a date of Feb. 6, 2007; pp. 1-6; located at http://en.wikipedia.org/wiki/Collaborative_filtering; Wikimedia Foundation, Inc.; USA.
"Dynamic web page"; Wikipedia.org; bearing a date of Feb. 19, 2007; pp. 1-3; printed on Mar. 30, 2007; located at http://en.wikipedia.org/wiki/Dynamic_web_page; Wikimedia Foundation, Inc.; USA.
"Earnings on Epinions.com"; Epinions.com; bearing a date of 1999-2007; pp. 1-3; printed on Feb. 12, 2007; located at http://www.epinions.com/help/faq/show_~faq_earnings; Shopping.com Inc.
"General Review Writing Guidelines"; Amazon.com; bearing a date of 1996-2007; pp. 1-2; printed on Feb. 12, 2007; located at http://www.amazon.com/gp/customer-reviews/guidelines/review-guid . . . ; Amazon.com.
Guernsey, Lisa; "Making Intelligence a Bit Less Artificial"; The New York Times; nytimes.com; May 1, 2003; pp. 1-4; printed on Feb. 12, 2007; located at http://www.nytimes.com/2003/05/01/technology/circuits/01reco.html; The New York Times Company.
Guha, R.; Kumar, Ravi; Raghavan, Prabhakar; Tomkins, Andrew; "Propagation of Trust and Distrust"; bearing a date of May 17-22, 2004; pp. 1-10; New York; USA.
"Help"; Amazon.com; pp. 1-6; Seattle; USA.
Kalseth, Fredrik; "Developing a Restaurant Recommender System"; Computer Science Presentation; May 4, 2005; pp. 1-70; located at http://affirmation.mine.nu.
"LiveSTATS.NET Technology"; Deepmetrix.com; bearing a date of 2005; pp. 1-4; printed on Mar. 1, 2007; located at http://www.deepmetrix.com/livestats/net/our_technology/index.aspx; Deepmetrix Corporation.
"MediaUnbound"; MediaUnbound.com; bearing a date of 2000-2006; 9 pages total; located at http://www.mediaunbound.com; MediaUnbound, Inc.
Nelson, Michelle; "A Penny for Your Thoughts at Epinions.com"; Smartcomputing.com; Apr. 2000; pp. 1-7; vol. 11 Issue 4; printed on Feb. 13, 2007; located at http/www.smartcomputing.com/editorial/article.asp?article=articies . . . ; Sandhills Publishing Company; USA.
Nicolai, Tom; Behrens, Nils; Thielemann, Heidi; "Be a Freeporter!: Enabling a Mobile News Publishing Community"; pp. 1-12; Center for Computing Technologies, Bremen.
O'Brien, Jeffrey M.; "The race to create a 'smart' Google"; CNNMoney.com; Nov. 20, 2006; pp. 1-5; printed on Feb. 9, 2007; located at http://money.cnn.com/magazines/fortune/fortune_archive/2006/11/2 . . . ; Cable News Network.
O'Donovan, John; Smyth, Barry; "Trust in recommender systems"; Proceedings of the 10th international conference on Intelligent user interfaces; 2005; pp. 1-4; ISBN: 1-58113-894-6; pp. 167-174; printed on Feb. 12, 2007; located at http://portal.acm.org/citation.cfm?coll=GUIDE&dl=GUIDE&id=10 . . . ; San Diego; USA.
"Patent"; Knowledgecenter.com; bearing dates of 1999-2006; pp. 1-2; printed on Feb. 13, 2007; located at http://www.knowledgecenter.com/patent.php; Knowledge Filter, Inc.
"Products Overview"; Nielsenbuzzmetrics.com; bearing a date of 2007; pp. 1-2; printed on Mar. 1, 2007; located at http://www.nielsenbuzzmetrics.com/products.asp; BuzzMetrics.
Resnick, Paul; Varian, Hal R.; "Recommender Systems"; pp. 1-6; printed on Feb. 9, 2007; located at http://www.acm.org/pubs/cacm/MAR97/resnick.html.
Sinha, Rashmi; "User Interfaces for Music Discovery"; UC Berkeley Presentation; pp. 1-4; printed on Feb. 12, 2007; located at http://www.rashmisinha.com/talks/audioiconRashmi.pdf.
"The Lean & Mean Review Challenge!"; Epinions.com; bearing a date of Feb. 2007 and 1999-2007; pp. 1-2; printed on Feb. 12, 2007; located at http://www0.epinions.com/member/?show=news & sub=sweepstakes_. . . ; Shopping.com, Inc.
"The Present and Future of Recommender Systems"; MyStrands.com; pp. 1-3; printed on Feb. 12, 2007; located at http://www.mystrands.com/corp/summerschool06.vm.
"The Web of Trust"; Epinions.com; bearing a date of 1999-2007; pp. 1-3; printed on Feb. 12, 2007; located at http://www0.epinions.com/help/faq/show_~faq_wot; Shopping.com, Inc.
"Trend Results"; Blogpulse.com; bearing dates of 2006 and 2005; pp. 1-2; printed on Mar. 1, 2007; located at http://www.blogpulse.com/trend?query1=%28%johng+roberts . . . ; Nielsen BuzzMetrics, Inc.
"Web analytics"; Wikipedia.org; bearing a date of Feb. 20, 2007; pp. 1-6; printed on Feb. 26, 2007; located at http://en.wikipedia.org/wiki/Web_analytics; Wikimedia Foundation, Inc.; USA.
Zhu, Tingshao; Greiner, Russ; Haubl, Gerald; Price, Bob; Jewell, Kevin; "A Trustable Recommender System for Web Content"; pp. 1-6; located at http://www.web-ic.com/paper/beyond2005.pdf.
"AdSense"; Wikipedia.org; bearing a date of May 31, 2007; pp. 1-5; printed on May 31, 2007; located at http://en.wikipedia.org/wiki/AdSense; Wikimedia Foundation, Inc.; USA.

"Ad Serving & Technology"; valueclick.com; bearing a date of 2007; p. 1; printed on Jun. 14, 2007; located at http://www.valueclick.com/solutions/; ValueClick, Inc.

"Affiliate & Search Marketing"; valueclick.com; bearing a date of 2007; p. 1; printed on Jun. 13, 2007; located at http://www.valueclick.com/solutions/affiliate_marketing.html; ValueClick, Inc.

Baker, Loren; "Google AdSense Testing Cost-Per-Action Payments"; Search Engine Journal; Jun. 21, 2006; pp. 1-8; printed on Jun. 13, 2007; located at http://www.searchenginejournal.com/google-adsense-testing-cost-per-action-payments/3561/; Search Engine Journal.

"Google AdSense Online Standard Terms and Conditions"; Google.com; bearing dates of Nov. 3, 2005 and 2007; pp. 1-5; printed on Jun. 13, 2007; located at https://www.google.com/adsense/static/en_US/Terms.html?gsession; Google.

"Operating Agreement"; Amazon.com; bearing a date of May 28, 2007; pp. 1-10; printed on Jun. 13, 2007; located at https://affiliate-program.amazon.com/gp/associates/agreement/ref; Amazon.com, Inc.

"The web's most popular and successful Affiliate"; Amazon.com; bearing dates of 1996-2007; pp. 1-2; printed on Jun. 13, 2007; located at https://affiliate-program.amazon.com/gp/associates/join; Amazon.com, Inc.

"Foistware / Spyware—Gator, OfferCompanion, Trickler, GAIN"; pp. 1-3; http://cexx.org/gator.htm; printed on Aug. 8, 2007.

Parker, Pamela; "Display Ads Drive Searches in Yahoo! Case Study"; ClickZ Network; May 9, 2005; 1 page; Incisive Interactive Marketing LLC.

* cited by examiner

DETERMINING INFLUENCERS

CROSS REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)):

RELATED APPLICATIONS

For purposes of the United States Patent and Trademark Office (USPTO) extra-statutory requirements (described more fully below), the present application constitutes:

1. A continuation-in-part application of U.S. patent application Ser. No. 11/799,460 entitled REWARDING INFLUENCERS, naming Gary W. Flake, William H. Gates, III, Alexander G. Gounares, W. Daniel Hillis, Royce A. Levien, Mark A. Malamud, Craig J. Mundie, Christopher D. Payne, Richard F. Rashid, Clarence T. Tegreene, Charles Whitmer, and Lowell L. Wood, Jr. as inventors, filed 30 Apr. 2007, which is currently co-pending, or is an application of which a currently co-pending application is entitled to the benefit of the filing date.

2. A continuation-in-part application of U.S. patent application Ser. No. 11/811,349 entitled REWARDING INFLUENCERS, naming Gary W. Flake, William H. Gates, III, Alexander G. Gounares, W. Daniel Hillis, Royce A. Levien, Mark A. Malamud, Craig J. Mundie, Christopher D. Payne, Richard F. Rashid, Clarence T. Tegreene, Charles Whitmer, and Lowell L. Wood, Jr. as inventors, filed 7 Jun. 2007, which is currently co-pending, or is an application of which a currently co-pending application is entitled to the benefit of the filing date.

3. A continuation-in-part application of U.S. patent application Ser. No. 11/799,461 entitled DETERMINING INFLUENCERS, naming Gary W. Flake, William H. Gates, III, Alexander G. Gounares, W. Daniel Hillis, Royce A. Levien, Mark A. Malamud, Craig J. Mundie, Christopher D. Payne, Richard F. Rashid, Clarence T. Tegreene, Charles Whitmer, and Lowell L. Wood, Jr. as inventors, filed 30 Apr. 2007, which is currently co-pending, or is an application of which a currently co-pending application is entitled to the benefit of the filing date.

4. A continuation-in-part application of U.S. patent application Ser. No. 11/811,402 entitled DETERMINING INFLUENCERS, naming Gary W. Flake, William H. Gates, III, Alexander G. Gounares, W. Daniel Hillis, Royce A. Levien, Mark A. Malamud, Craig J. Mundie, Christopher D. Payne, Richard F. Rashid, Clarence T. Tegreene, Charles Whitmer, and Lowell L. Wood, Jr. as inventors, filed 8 Jun. 2007, which is currently co-pending, or is an application of which a currently co-pending application is entitled to the benefit of the filing date.

5. A continuation-in-part application of U.S. patent application Ser. No. 11/824,551 entitled REPORTING INFLUENCE ON A PERSON BY NETWORK-AVAILABLE CONTENT filed 29 Jun. 2007, which is currently co-pending, or is an application of which a currently co-pending application is entitled to the benefit of the filing date.

6. A continuation-in-part application of U.S. patent application Ser. No. 11/824,582 entitled COLLECTING INFLUENCE INFORMATION, naming Gary W. Flake, William H. Gates, III, Alexander G. Gounares, W. Daniel Hillis, Royce A. Levien, Mark A. Malamud, Craig J. Mundie, Christopher D. Payne, Richard F. Rashid, Clarence T. Tegreene, Charles Whitmer, and Lowell L. Wood, Jr. as inventors, filed 29 Jun. 2007, which is currently co-pending, or is an application of which a currently co-pending application is entitled to the benefit of the filing date.

7. A continuation-in-part application of U.S. patent application Ser. No. 11/906,537 entitled COLLECTING INFLUENCE INFORMATION, naming Gary W. Flake, William H. Gates, III, Alexander G. Gounares, W. Daniel Hillis, Royce A. Levien, Mark A. Malamud, Craig J. Mundie, Christopher D. Payne, Richard F. Rashid, Clarence T. Tegreene, Charles Whitmer, and Lowell L. Wood, Jr. as inventors, filed 1 Oct. 2007, which is currently co-pending, or is an application of which a currently co-pending application is entitled to the benefit of the filing date.

8. A continuation-in-part application of U.S. patent application Ser. No. 11/824,580 entitled DETERMINING AN INFLUENCE ON A PERSON BY WEB PAGES, naming Gary W. Flake, William H. Gates, III, Alexander G. Gounares, W. Daniel Hillis, Royce A. Levien, Mark A. Malamud, Craig J. Mundie, Christopher D. Payne, Richard F. Rashid, Clarence T. Tegreene, Charles Whitmer, and Lowell L. Wood, Jr. as inventors, filed 29 Jun. 2007, which is currently co-pending, or is an application of which a currently co-pending application is entitled to the benefit of the filing date.

9. A continuation-in-part application of U.S. patent application Ser. No. 11/881,800 entitled REWARDING INDEPENDENT INFLUENCERS, naming Gary W. Flake, William H. Gates, III, Alexander G. Gounares, W. Daniel Hillis, Royce A. Levien, Mark A. Malamud, Craig J. Mundie, Christopher D. Payne, Richard F. Rashid, Clarence T. Tegreene, Charles Whitmer, and Lowell L. Wood, Jr. as inventors, filed 27 Jul. 2007, which is currently co-pending, or is an application of which a currently co-pending application is entitled to the benefit of the filing date.

10. A continuation-in-part application of U.S. patent application Ser. No. 11/906,780 entitled REWARDING INDEPENDENT INFLUENCERS, naming Gary W. Flake, William H. Gates, III, Alexander G. Gounares, W. Daniel Hillis, Royce A. Levien, Mark A. Malamud, Craig J. Mundie, Christopher D. Payne, Richard F. Rashid, Clarence T. Tegreene, Charles Whitmer, and Lowell L. Wood, Jr. as inventors, filed 2 Oct. 2007, which is currently co-pending, or is an application of which a currently co-pending application is entitled to the benefit of the filing date.

11. A continuation-in-part application of U.S. patent application Ser. No. 12/290,310 entitled REWARDING INFLUENCERS, naming Gary W. Flake, William H. Gates, III, Alexander G. Gounares, W. Daniel Hillis, Royce A. Levien, Mark A. Malamud, Craig J. Mundie, Christopher D. Payne, Richard F. Rashid, Clarence T. Tegreene, Charles Whitmer, and Lowell L. Wood, Jr. as inventors, filed 28 Oct. 2008, which is currently co-pending, or is an application of which a currently co-pending application is entitled to the benefit of the filing date.

12. A continuation-in-part application of U.S. patent application Ser. No. 12/290,675 entitled REWARDING INFLUENCERS, naming Gary W. Flake, William H. Gates, III, Alexander G. Gounares, W. Daniel Hillis, Royce A. Levien, Mark A. Malamud, Craig J. Mundie, Christopher D. Payne, Richard F. Rashid, Clarence T. Tegreene, Charles Whitmer, and Lowell L. Wood, Jr. as inventors, filed 31 Oct. 2008, which is currently co-pending, or is an application of which a currently co-pending application is entitled to the benefit of the filing date.

The United States Patent and Trademark Office (USPTO) has published a notice to the effect that the USPTO's computer programs require that patent applicants both reference a serial number and indicate whether an application is a continuation or continuation in part. Stephen G. Kunin, Benefit of Prior-Filed Application, USPTO Electronic Official Gazette, Mar. 18, 2003. The present applicant entity has provided a specific reference to the application(s) from which priority is being claimed as recited by statute. Applicant entity understands that the statute is unambiguous in its specific reference language and does not require either a serial number or any characterization such as "continuation" or "continuation-in-part." Notwithstanding the foregoing, applicant entity understands that the USPTO's computer programs have certain data entry requirements, and hence applicant entity is designating the present application as a continuation in part of its parent applications, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

FIELD OF THE DISCLOSURE

The present disclosure relates generally to determining influencers in a Web 2.0 environment. More specifically, in some implementations, an influence of an electronically-accessed content on an involvement between an accessor and a third party is determined. In further implementations, a provider of the electronically accessed content may be rewarded based on the determined influence.

BACKGROUND

As the communication network commonly known as the Web (or Internet) continues to evolve, contemporary web development efforts are being directed toward improved Web-based applications that improve user interaction, functionality, and utility. These development efforts, widely referred to as "Web 2.0," are leading to a surge of innovation and are resulting in a rapid evolution of the means through which electronic content is being provided and accessed on the Web. While desirable results are being achieved, there remains a need to incentivize providers of electronically accessed content.

SUMMARY

The present disclosure relates generally to determining influencers, and more specifically, to determining an influence of an electronically accessed content on an involvement between an accessor and a third party. In some implementations, the determination of the influence may be performed in a Web 2.0 environment, and a provider of the electronically accessed content may be rewarded based on the determined influence.

DETAILED DESCRIPTION

Techniques for determining influencers, and more specifically, to determining an influence of an electronically accessed content on an involvement between an accessor and a third party, are disclosed. It will be appreciated that many specific details of certain implementations are set forth in the following description and in the accompanying figures to provide a thorough understanding of such implementations. One skilled in the art will understand from the teachings of the present disclosure, however, that the present disclosure may have other possible implementations, and that such other implementations may be practiced with/without some of the details set forth in the following description.

Exemplary Environments

Exemplary environments in which various implementations in accordance with the present disclosure may be implemented are described in this section with reference to FIGS. 1 through 4. It will be appreciated, however, that the following description of exemplary environments is not exhaustive of all possible environments in which the teachings of the present disclosure may be implemented.

Figure 1:
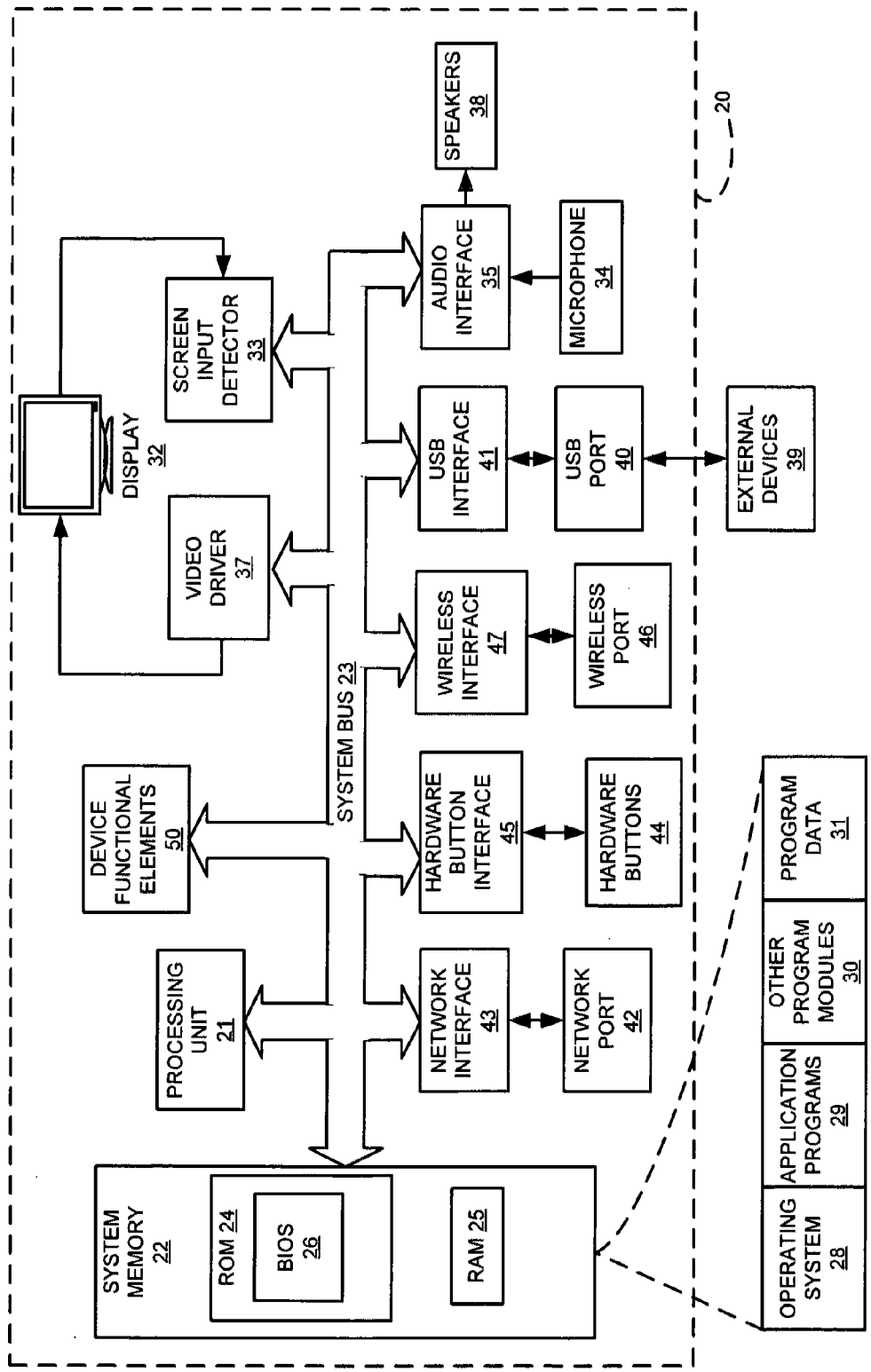
FIG. 1 illustrates an exemplary embodiment of a computing device in which embodiments may be implemented.

For example, FIG. 1 illustrates an exemplary system that includes a computing device 20, which may be included in an electronic device that also includes a device functional element 50. For example, the electronic device may include any item having electrical and/or electronic components playing a role in a functionality of the item, such as a limited resource computing device, an electronic pen, a handheld electronic writing device, a digital camera, a scanner, an ultrasound device, an x-ray machine, a non-invasive imaging device, a cell phone, a printer, a refrigerator, a car, and an airplane. The thin computing device 20 includes a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between sub-components within the thin computing device 20, such as during start-up, is stored in the ROM 24. A number of program modules may be stored in the ROM 24 and/or RAM 25, including an operating system 28, one or more application programs 29, other program modules 30 and program data 31.

A user may enter commands and information into the computing device 20 through input devices, such as a number of switches and buttons, illustrated as hardware buttons 44, connected to the system via a suitable interface 45. Input devices may further include a touch-sensitive display screen 32 with suitable input detection circuitry 33. The output circuitry of the touch-sensitive display 32 is connected to the system bus 23 via a video driver 37. Other input devices may include a microphone 34 connected through a suitable audio interface 35, and a physical hardware keyboard (not shown). In addition to the display 32, the computing device 20 may include other peripheral output devices, such as at least one speaker 38.

Other external input or output devices 39, such as a joystick, game pad, satellite dish, scanner or the like may be connected to the processing unit 21 through a USB port 40 and USB port interface 41, to the system bus 23. Alternatively, the other external input and output devices 39 may be connected by other interfaces, such as a parallel port, game port or other port. The computing device 20 may further include or be capable of connecting to a flash card memory (not shown) through an appropriate connection port (not shown). The computing device 20 may further include or be capable of connecting with a network through a network port 42 and network interface 43, and wireless port 46 and corresponding wireless interface 47 may be provided to facilitate communication with other peripheral devices, including other computers, printers, and so on (not shown). It will be appreciated that the various components and connections shown are exemplary and other components and means of establishing communications links may be used.

The computing device 20 may be primarily designed to include a user interface. The user interface may include a character, a key-based, and/or another user data input via the touch sensitive display 32. The user interface may include using a stylus (not shown). Moreover, the user interface is not limited to an actual touch-sensitive panel arranged for directly receiving input, but may alternatively or in addition respond to another input device such as the microphone 34. For example, spoken words may be received at the microphone 34 and recognized. Alternatively, the computing device 20 may be designed to include a user interface having a physical keyboard (not shown).

The device functional elements 50 are typically application specific and related to a function of the electronic device, and are coupled with the system bus 23 through an interface (not shown). The functional elements may typically perform a single well-defined task with little or no user configuration or setup, such as a refrigerator keeping food cold, a cell phone connecting with an appropriate tower and transceiving voice or data information, and a camera capturing and saving an image.

Figure 2:
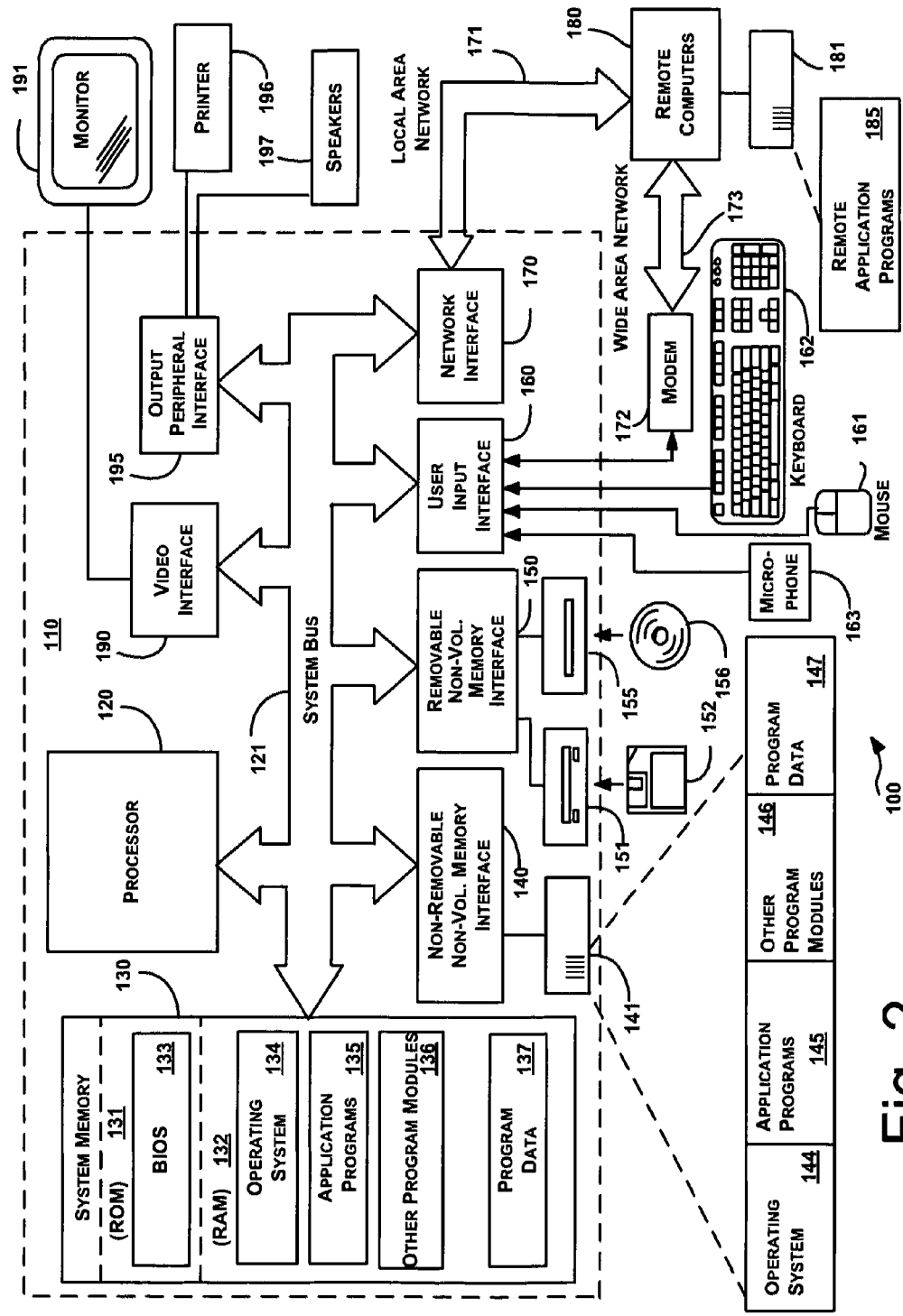
FIG. 2 illustrates an exemplary embodiment of a computing system in which embodiments may be implemented.

FIG. 2 illustrates an exemplary embodiment of a general-purpose computing system in which embodiments may be implemented, shown as a computing system environment 100. Components of the computing system environment 100 may include, but are not limited to, a computing device 110 having a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computing system environment 100 typically includes a variety of computer-readable media products. Computer-readable media may include any media that can be accessed by the computing device 110 and include both volatile and nonvolatile media, removable and non-removable media. By way of example, and not of limitation, computer-readable media may include computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 110. In a further embodiment, a computer storage media may include a group of computer storage media devices. In another embodiment, a computer storage media may include an information store. In another embodiment, an information store may include a quantum memory, a photonic quantum memory, and/or atomic quantum memory. Combinations of any of the above may also be included within the scope of computer-readable media.

Communications media may typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media such as a wired network and a direct-wired connection and wireless media such as acoustic, RF, optical, and infrared media.

The system memory 130 includes computer storage media in the form of volatile and nonvolatile memory such as ROM 131 and RAM 132. A RAM may include at least one of a DRAM, an EDO DRAM, a SDRAM, a RDRAM, a VRAM, and/or a DDR DRAM. A basic input/output system (BIOS) 133, containing the basic routines that help to transfer information between elements within the computing device 110, such as during start-up, is typically stored in ROM 131. RAM 132 typically contains data and program modules that are immediately accessible to or presently being operated on by processing unit 120. By way of example, and not limitation, FIG. 2 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS" are well known in the art.

The computing device 110 may also include other removable/non-removable, volatile/nonvolatile computer storage media products. By way of example only, FIG. 2 illustrates a non-removable non-volatile memory interface (hard disk interface) 140 that reads from and writes for example to non-removable, non-volatile magnetic media. FIG. 2 also illustrates a removable non-volatile memory interface 150 that, for example, is coupled to a magnetic disk drive 151 that reads from and writes to a removable, non-volatile magnetic disk 152, and/or is coupled to an optical disk drive 155 that reads from and writes to a removable, non-volatile optical disk 156, such as a CD ROM. Other removable/nonremovable, volatile/non-volatile computer storage media that can be used in the exemplary operating environment include, but are not limited to, magnetic tape cassettes, memory cards, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable non-volatile memory interface, such as interface 150.

The drives and their associated computer storage media discussed above and illustrated in FIG. 2 provide storage of computer-readable instructions, data structures, program modules, and other data for the computing device 110. In FIG. 2, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies. A user may enter commands and information into the computing device 110 through input devices such as a microphone 163, keyboard 162, and pointing device 161, commonly referred to as a mouse, trackball, or touch pad. Other input devices (not shown) may include a joystick, game pad, satellite dish, and scanner. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computing system environment 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computing device 110, although only a memory storage device 181 has been illustrated in FIG. 2. The logical connections depicted in FIG. 2 include a local area network (LAN) 171 and a wide area network (WAN) 173, but may also include other networks such as a personal area network (PAN) (not shown). Such networking environments are commonplace in offices, enterprise-wide computer networks, intranets, and the Internet.

When used in a LAN networking environment, the computing system environment 100 is connected to the LAN 171 through a network interface or adapter 170. When used in a WAN networking environment, the computing device 110 typically includes a modem 172 or other means for establishing communications over the WAN 173, such as the Internet. The modem 172, which may be internal or external, may be connected to the system bus 121 via the user input interface 160, or via another appropriate mechanism. In a networked environment, program modules depicted relative to the computing device 110, or portions thereof, may be stored in a remote memory storage device. By way of example, and not limitation, FIG. 2 illustrates remote application programs 185 as residing on computer storage medium 181. It will be appreciated that the network connections shown are exemplary and other means of establishing communications link between the computers may be used.

Figure 3:
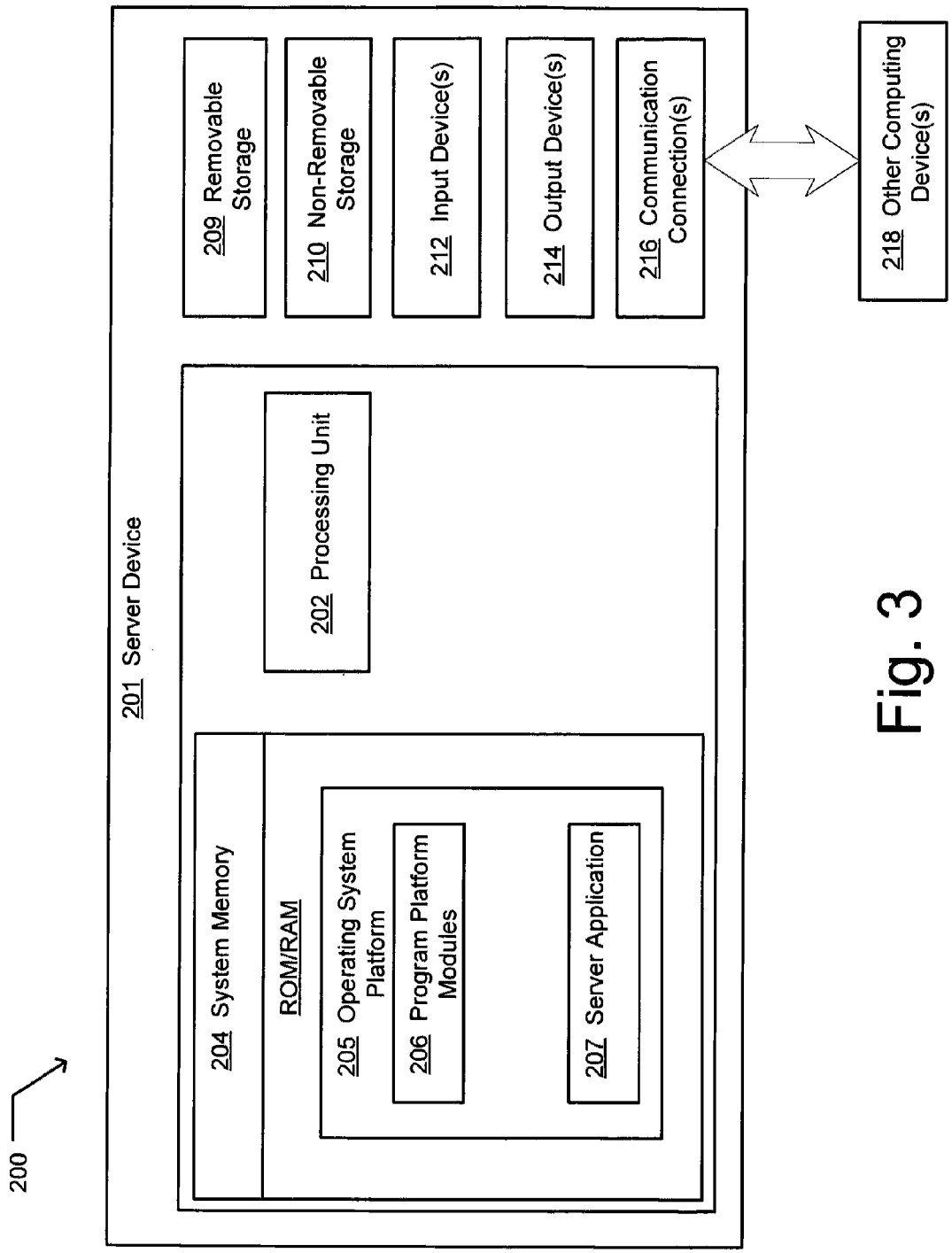
FIG. 3 illustrates another exemplary system in which embodiments may be implemented.

FIG. 3 illustrates an exemplary system 200 in which embodiments may be implemented. The exemplary system includes a computing system couplable to a network and operable to provide electronic content, such as a server 201. In an embodiment, the server may include an application server, audio server, database server, fax server, file server, intranet server, mail server, merchant server, modem server, network access server, network server, print server, proxy server, remote access server, telephony server, terminal server, video server, and/or Web server. In another embodiment, the server may include a network intermediary, a network switch, and/or a router. Server functionality may be implemented in software, hardware, firmware, and/or a combination thereof. Server functionality may be provided by a computing device that also provides other functionality. The network may include an electronic network, an optical network, and/or a combination of optical and electronic networks.

In a configuration, the server 201 typically includes at least one processing unit 202 and system memory 204. System memory 204 typically includes operating system platform 205 and one or more program modules 206 running on operating system. In addition to the program modules 206, a server application 207 may also be running on the operating system. The server application 207 may be operable to deliver electronic content and/or files to applications via a protocol, and may include and/or interact with other computing devices, application servers, applications, and application interfaces (APIs) residing in other applications. For example, the server application may include a Web server operable to deliver Web pages and/or electronic content to Web browser applications via HTTP protocols.

The server 201 may have additional features or functionality. For example, server may also include additional data storage devices (removable and/or non-removable), as illustrated in FIG. 3 by removable storage 209 and non-removable storage 210. System memory 204, removable storage 209 and non-removable storage 210 are all examples of computer storage media. The server may include input device(s) 212 and output device(s) 214. The server also contains communication connections 216 that allow the device to communicate with and perform a service associated with a network, including communicating with other servers and/or with other computing device, illustrated as other computing device(s) 218. Communication connections 216 are one example of communication media.

FIGS. 1-3 are intended to provide a brief, general description of illustrative and/or suitable exemplary environments in which embodiments may be implemented. An exemplary system may include the thin computing device 20 of FIG. 1, the computing system environment 100 of FIG. 2, and/or the server of FIG. 3. FIGS. 1-3 are examples of a suitable environment and are not intended to suggest any limitation as to the structure, scope of use, or functionality of an embodiment. A particular environment should not be interpreted as having any dependency or requirement relating to any one or combination of components illustrated in an exemplary environment. For example, in certain instances, one or more elements of an environment may be deemed not necessary and omitted. In other instances, one or more other elements may be deemed necessary and added. Further, it will be appreciated that device(s) and/or environment(s) described herein may include numerous electrical, optical, mechanical, and/or digital components that may be necessary to operate the device, but are not needed to illustrate the subject matter described herein. As such, some of these electrical, optical, mechanical, and/or digital components may be omitted from the specification for clarity.

In the description that follows, certain embodiments may be described with reference to acts and symbolic representations of operations that are performed by one or more computing devices, such as the computing device 110 of FIG. 2. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Embodiments may be implemented with numerous other general-purpose or special-purpose computing devices and computing system environments or configurations. Examples of well-known computing systems, environments, and configurations that may be suitable for use with an embodiment include, but are not limited to, personal computers, handheld or laptop devices, personal digital assistants, multiprocessor systems, microprocessor-based systems, set top boxes, programmable consumer electronics, network, minicomputers, server computers, game server computers, web server computers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

Figure 4:
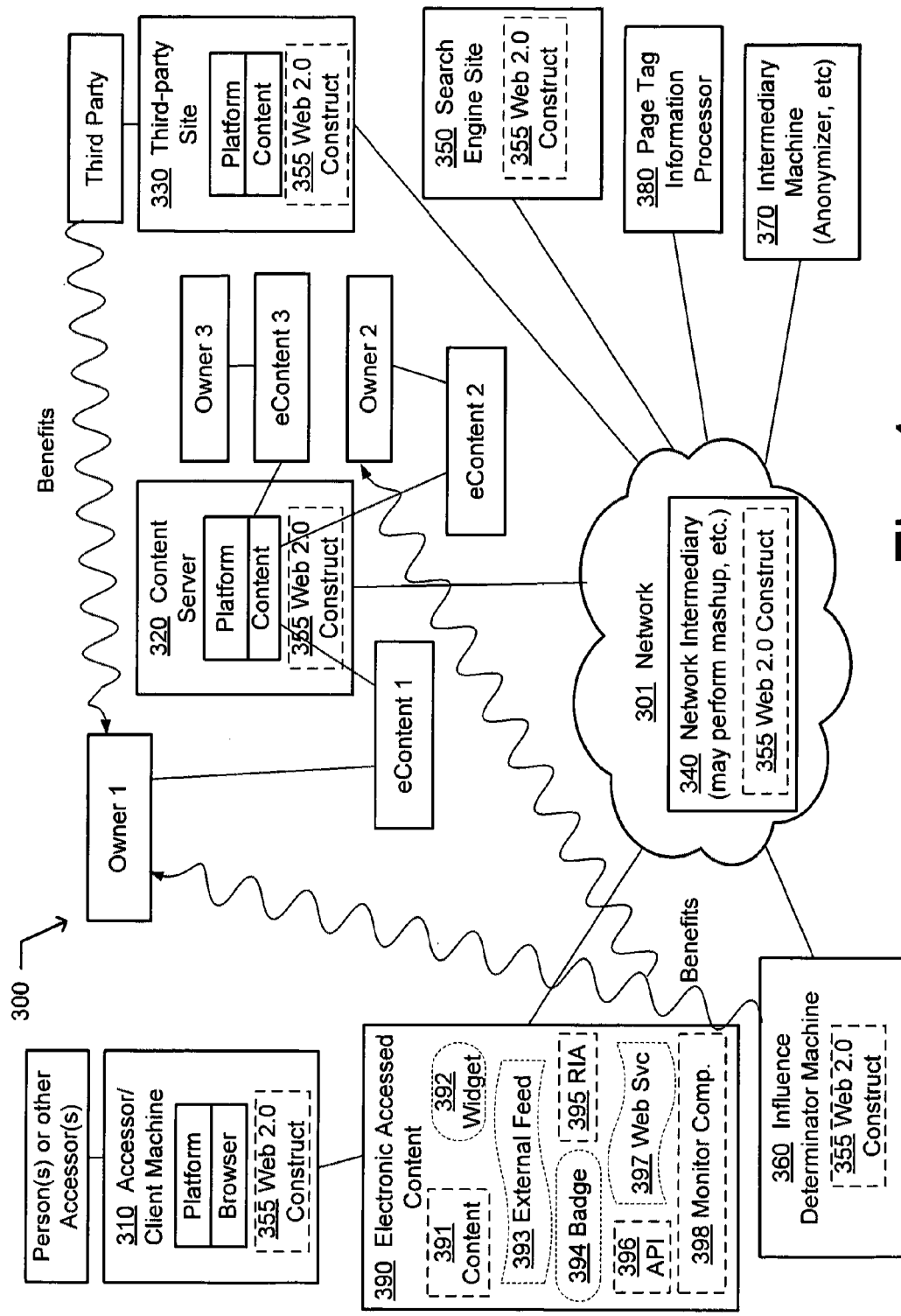
FIG. 4 illustrates an exemplary network environment in which embodiments may be implemented.

FIG. 4 illustrates an exemplary network environment 300 in which embodiments may be implemented. The exemplary environment may include one or more networks, illustrated as a network 301, and one or more client (or accessor) machines, illustrated as client (or accessor) machine 310. A fabric of the network 301 may include network intermediaries, illustrated as a network intermediary 340 running on a platform (not shown). In an embodiment, the client machine includes a computing device used by a human user. In another embodiment, the client machine includes a computing device used by a human user to communicate in a peer-to-peer environment (P2P), and/or to communicate in a cloud-to-cloud environment (C2C). In a further embodiment, the client machine includes a computing device used by a human user to communicate with a server. The client machine may include the thin computing device 20 illustrated in FIG. 1, and/or the computing device 110 illustrated in FIG. 2.

The exemplary environment 300 may also include one or more servers, illustrated as a content server 320. In an embodiment, the content server is operable to provide electronic content (illustrated as eContent 1 and/or eContent 2) to one or more client machines. In another embodiment, the content server includes the server 201 illustrated in FIG. 3. In a further embodiment, the content server(s) includes a node in P2P and/or a C2C network. The node may include the thin computing device 20 illustrated in FIG. 1, and/or the computing device 110 illustrated in FIG. 2. The exemplary environment 300 may also include one or more third-party sites, illustrated as a third-party site 330. The third-party site may include a merchant site, such as amazon.com for books, a manufacturer site, such as subaru.com for automobiles, a religious institution, such as catholic.org and/or hinduism.com, and/or a political site, such as rnc.org and/or democrats.org. The exemplary environment 300 may also include one or more search engine sites, illustrated as a search engine site 350. The search engine site may include a general search engine site, such as google.com and/or live.com. In another embodiment, the search engine site may include a topical search site, such as HONMedhunt and/or FindLaw.com.

The exemplary environment 300 may also include an influence determinator machine 360, an intermediary machine 370, and/or a page tag information processor 380. Each of these machines may be operable to receive data and/or information gathered by at least one of the client machine 310, the content server 320, the third-party site 330, and/or the network intermediary 340, and to produce an output usable in assessing an influence on a person using the client machine by a content of the content server.

As further shown in FIG. 4, one or more components of the network environment 300 may cooperatively provide an electronic accessed content 390 that may be accessed by the accessor (or client) machine 310. In some implementations, the electronic accessed content 390 may include one or more portions or components. For example, in some implementations, the electronic accessed content 390 may include a mashup of similar or different portions or components, or a plurality of mashups.

More specifically, with continued reference to FIG. 4, in some implementations, the electronic accessed content 390 may include one or more of the following components or types: a content 391 (e.g. text, audio, visual, video, or other suitable content), a widget 392 (e.g. clock, weather monitor, music provider, news provider, game, entertainment provider, story provider, article provider, stock market tracker, etc.), an external feed 393 (e.g. clock, weather monitor, music provider, news provider, game, entertainment provider, story provider, article provider, stock market tracker, etc.), a badge 394 (e.g. animal, brand name, musical group, sports content, humorous content, entertainment content, nationality content, religious content, affinity content, affiliation content, etc.), a Rich Internet Application (RIA) 395 (e.g. virtual weather provider, virtual experience provider, news provider, designer, entertainment provider, shopping facilitator, analytical facilitator, etc.), an Application Programming Interface (API) 396 (e.g. file operations, file references, geometry and topology operations, feature operations, projects, drawing and dimensional operations, assembly operations, user interfaces, user preferences, etc.), a web service 397 (e.g. search service, mapping service, directions service, spelling and grammar services, etc.), and a monitoring component 398 (e.g. tracking component, access monitor, registration component, etc.). Of course, in alternate implementations, the electronic accessed content 390 may include any other suitable components or content types.

The network environment 300 further includes one or more Web 2.0 constructs 355 which may be located or distributed on one or more components within the environment 300. For example, in some implementations, a Web 2.0 construct 355 may be located on the network 301, the accessor/client machine 310, the content server 320, the third-party site 330, the network intermediary 340, the search engine site 350, the influence determinator machine 360, or any other component of the network environment 300. As used herein, the term "Web 2.0 construct" (or "machine-implemented Web 2.0 construct") may include a wide variety of constructs implemented in software, hardware, firmware, or combinations thereof. For example, a "Web 2.0 construct" may include a web-based application, a web service, an asynchronous application, an API, an RIA application, an Ajax (Asynchronous JavaScript and XML (Extensible Markup Language)) application, a Flex application, a Flash® application, a Web 2.0 engine, or a mashup that includes one or more of the aforementioned constructs.

It should be appreciated that the exemplary systems and environments described above with reference to FIGS. 1-4 are merely illustrative of a few of the many possible systems and environments in which the teachings of the present disclosure may be implemented, and that the teachings herein are not limited to the particular systems and environments described above. For example, additional exemplary systems and environments in accordance with the teachings of the present disclosure are described below with respect to FIGS. 15-21.

Exemplary Processes for Determining Influencers

Exemplary processes for determining influencers in accordance with the teachings of the present disclosure are described below with reference to FIGS. 5 through 14. It will be appreciated, however, that the following description of exemplary processes is not exhaustive of all possible processes in accordance with the teachings of the present disclosure.

To provide an improved understanding of various aspects described below, a few representative embodiments of methods in accordance with the present disclosure will be described. For example, consider a simple scenario involving a consumer that is pondering whether to purchase a gadget. There are several different competing suppliers from which the consumer may purchase different models of the gadget. During a pre-purchase shopping period, the consumer visits several different websites, accessing electronic content on each website that discusses various aspects of the different models available from the different competing suppliers. Among the several factors involved in the consumer's decision (e.g. cost, performance, size, weight, appearance, reputation, etc.), there may be a particular factor that is of relatively-higher importance to this particular consumer. Assume for the purpose of this scenario that the particular factor that is most important to this consumer is the size of the gadget. During the consumer's shopping period, which may take place over an extended period of time (e.g. days, weeks, months, etc.), one particular site may provide electronic content that provides a useful comparison of the various sizes of the different models of the gadget that are available from the various different suppliers (e.g. sizeeasy.com), compelling or enabling the consumer to make a decision. The consumer may then purchase a particular model of the gadget from a particular supplier.

Embodiments of processes and systems in accordance with the teachings of the present disclosure may advantageously determine an influence of one or more of the various electronic contents accessed by the consumer on the consumer's ultimate decision to purchase a particular product from a particular supplier. In the representative scenario described above, the site that provided the comparison of the various sizes of the different models of the gadget was the most influential on this particular consumer's purchase decision. In at least some embodiments, a process in accordance with the present disclosure may provide a way to associate the consumer's accessing of the various electronic content during the shopping period with the consumer's ultimate purchase decision, including determining an influence of one or more of the various electronic contents on the consumer's purchase. In still other embodiments, the provider of the most influential electronic content may receive a benefit, such as from the supplier from whom the consumer purchased the gadget.

Various ways of associating the consumer's accessing of the various electronic content during the shopping period with the consumer's ultimate purchase decision have been conceived and are described more fully below. For example, in at least some embodiments, a process may analyze a consumer's behavior before and after accessing a site's electronic content, and make assumptions about relative influence of the electronic content based on the analysis. In a particular embodiment, for example, an analysis may determine that the consumer made a purchase immediately (e.g. within 48 hours) after accessing an electronic content that recommended a product. In other embodiments, an analysis may determine that the consumer terminated shopping activities after accessing an electronic content, followed by a registration of a new product following a period of time (e.g. days, weeks, months, etc.).

The analysis of the consumer's behavior before accessing a site's electronic content and after visiting the site's electronic content may be performed in a variety of ways. For example, in some embodiments, the analysis may be performed by an entity that analyzes the consumer's behavior. In other embodiments, a component (e.g. software, hardware, firmware, or combinations thereof) may be provided on an electronic device of the consumer that analyzes the consumer's behavior. The component and/or the entity may analyze publicly-available information or privately-available information (or both) to determine an influence of an electronic content on the consumer's purchase decision. For example, in some embodiments, analyzing the consumer's behavior may include an analysis of a consumer's internet browsing history, cache history, electronic mail history, credit card history, bank account history, electronic notes, and/or other suitable publicly or privately-available information. An analysis component may search through such information sources for strings, key words, phrases, data, or any other suitable indicia.

Although a process may analyze privately-available information, it will be appreciated that such privately-available information need not be publicly revealed as a result of such analyses. For example, in at least some embodiments, although a process analyzes a consumer's privately-available information the process need not record, transmit, or reveal such information to any other entities in order to determine an influence of one or more of the various electronic contents on the consumer's purchase. More specifically, in at least some embodiments, a process may reveal a final determination (e.g. conclusion, hypothesis, etc.) about an influence of an electronic content on the consumer's purchase without revealing any privately-available information used in formulating the determination (e.g. the accessed content from website x was the most influential in the consumer's decision to purchase the gadget from the supplier).

Of course, a variety of other ways of associating the consumer's accessing of electronic content with the consumer's ultimate purchase decision may be conceived in accordance with the teachings of the present disclosure. In some embodiments, the consumer may be queried as to the various websites visited and requested to provide direct input on the influence of such websites on the consumer's decision. For example, consider another simple scenario in which a consumer visits several websites during the course of shopping for a service or product (e.g. a camera). The consumer's browsing activity during a pre-purchase period may be tracked, and following a purchase, the consumer may be presented with a list of the sites visited by the consumer and queried about the relative influence of the sites. For example, the consumer may be presented with a list of thumbnails of sites visited during the pre-purchase period, and may be asked to rank them in order of influence (e.g. "here are the thumbnails of sites you visited, which was most helpful to you?"). In some embodiments, the consumer may be queried at the time of sale of a product or service via a supplier's (or a third party's) website. Alternately, the query for user input may occur in a non-online setting, such as at a brick-and-mortar retail outlet or point-of-sale, or other suitable non-online procedure (e.g. follow-up mailing, telephone poll, etc.). In some embodiments, the user may be presented with a multiple choice menu that enables the user to provide a ranking of the relative influence (e.g. most positive, positive, neutral, negative, most negative, etc.) of each site visited. It will be appreciated that information on negative results may be of interest to product suppliers in order to provide improvements to products or services offered.

In yet another representative scenario, a vendor or provider of a product or service may develop one or more various models for automated determination of an influence of an electronic content on a consumer's decision. In at least some implementations, an influence determination component may be located on an electronic platform (e.g. computer, cell phone, personal data assistant, etc.) that may perform the desired influence determinations.

For example, in some embodiments, a model for automated influence determination may include one or more classes of sites that contain electronic content that may be relevant to an accessor's decision to purchase (or not to purchase) a product or service. By analyzing an access history of the accessor, an automated model may determine that a particular site or a particular electronic content was accessed by the accessor prior to the purchase, and may assume a relative influence of the particular site or the particular electronic content based on a weighting formula or other suitable means. In some implementations, for example, it may be known (or assumed) that content from a first source (e.g. a technical column in the New York Times) is more influential (e.g. based on relative numbers of readers, polling data, statistics, etc.) than content from a second source (e.g. an advertisement on craigslist.com). It will be appreciated that in some implementations, the accessor's history of accessing information may be obtained from information contained on the accessor's electronic device (e.g. computer, cell phone, personal data assistant, etc.), or alternately, may be received from the various sites visited by the accessor (e.g. when visited by accessor, number of times visited by accessor, duration of visit(s), clicks made, contents accessed, etc.). An automated model may then apply logic to such information to determine the relative influence of the accessed content(s) on the accessor's decision.

In at least some implementations, a supplier of an electronic platform (e.g. computer, cell phone, personal data assistant, etc.) may include some type of logic or component into the electronic platform that is configured to perform the desired influence determinations. Alternately, such influence determinations may reside within a supplier's site or that of a third party.

In another aspect, the sites or electronic contents accessed by the accessor may leave data or information behind on the accessor's electronic device that is detectable by an analysis component to assist in the subsequent influence determination. For example, in some implementations, a packet of information (e.g. a cookie) may be stored on the accessor's electronic device that provides access information of interest in the influence determination (e.g. when visited by accessor, number of times visited by accessor, duration of visit(s), clicks made, contents accessed, etc.). Alternately, a signature of an accessed site may be left by an accessed site, such as by particular numerical values (e.g. unique size values, dimensional values, ratings, capabilities, etc.), terms, words, phrases or other indicia contained within the information accessed by the accessor which may remain on the accessor's electronic device.

In a particular implementation, an analysis component may determine an influence of a particular electronic content based on a discernable pattern over time. For example, in some implementations, an analysis component may assume that a most-recently-acquired electronic content was the most influential to a purchaser's decision. Alternately, an analysis component may analyze an electronic document that was developed during the purchaser's shopping period, and may search for patterns that indicate a relative influence of a particular electronic content or site (e.g. differences in a note-taking document before/after visiting a site, evolution of such a note-taking document to determine where each piece comes from to determine influence, determination of a first accessed site or content that caused the accessor to include the identity of the particular product purchased into the note-taking document as being the most influential, etc.).

Figure 5:
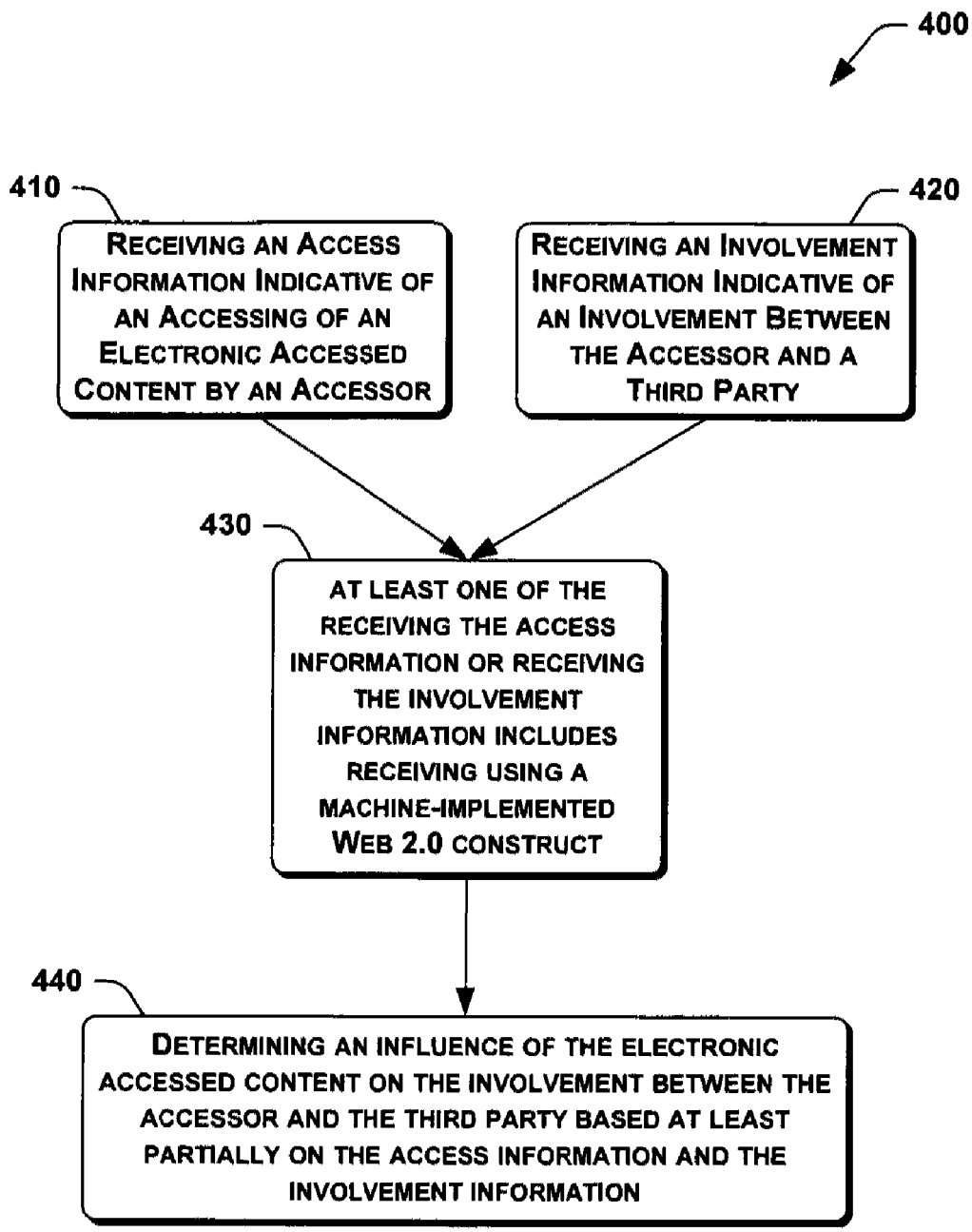
FIGS. 5 through 14 are flowcharts of various embodiments of methods of determining an influence of an electronically accessed content in accordance with various implementations of the present disclosure.

Additional embodiments and aspects of processes and systems in accordance with the present disclosure will now be described with reference to the accompanying figures. For example, FIG. 5 is a flowchart of method 400 of an influence determination method in accordance with at least some embodiments of the present disclosure. More specifically, in this implementation, the method 400 includes receiving an access information indicative of an accessing of an electronic accessed content by an accessor at 410, and receiving an involvement information indicative of an involvement between the accessor and a third party at 420. In this implementation, at least one of receiving the access information or receiving the involvement information includes receiving using a machine-implemented Web 2.0 construct (at 430). In addition, the method 400 includes determining a determined influence of the electronic accessed content on the involvement between the accessor and the third party based at least partially on the access information and the involvement information at 440.

For example, in some implementations, receiving an access information indicative of an accessing of an electronic accessed content by an accessor at 410 may include receiving data indicating that a web browser associated with a particular consumer has accessed a particular website for a particular duration of time, or that a mobile device (e.g. cellular telephone) has requested a download of a particular podcast of information. In another representative example, data may be received indicative of a consumer accessing a first product-related content comparing a first brand of cameras (Brand A) to a second brand of cameras (Brand B), and also indicative of the consumer assessing a second product-related content comparing the first and second brands of cameras (Brand A and B), the third party being a provider (e.g. manufacturer, wholesaler, retailer, advertiser, etc.) of either the Brand A camera or the Brand B camera.

Similarly, in at least some implementations, the receiving an involvement information indicative of an involvement between the accessor and a third party at 420 may include, for example, receiving data indicating that the above-mentioned consumer conducted a transaction with a particular vendor of goods or services, or that a user of the aforesaid cellular telephone conducted business with a broker. For example, in some implementations, receiving an involvement information indicative of an involvement between the accessor and a third party at 420 may include receiving data indicating that a web browser associated with a particular consumer has transacted a purchase from a product provider, or that a mobile device (e.g. cellular telephone) has transacted a purchase from a service provider. In another representative example, data may be received indicative of a consumer ordering a first product from a retailer (e.g. Brand A cameras), or receiving a purchase confirmation (e.g. via a text message on a cellular telephone).

It will be appreciated that a wide variety of machine-implemented Web 2.0 constructs may be used for at least one of receiving the access information or receiving the involvement information includes receiving using a machine-implemented Web 2.0 construct at 430, including, for example, an Ajax (Asynchronous JavaScript and XML (Extensible Markup Language)) application, an asynchronous application, a Flash® application, a web service, any other suitable Web 2.0 engine (or content or construct), or a mashup that includes one or more of the afore-mentioned constructs.

It will be appreciated that the access information or the involvement information may take many suitable forms. For example, such information may include at least one of a user input, a keystroke, a navigation command, a mouse movement, a caching information, a session information, and/or a visit information, and may include information associated with, incidental to, and/or responsive to one or more of user mouse movements, scrolling movements, purchases, operations, visited Websites, visited blogs, page views, page visits, viewing time, repeat visits, page tags, printing a content, click stream, search strings, local search strings, interactions, scrolling, menu activity, corresponding/related to browsing the Internet, cut and paste, print history, browsing history, email, cookies, user keystrokes, logged keystrokes along with the window name into which they are typed, email sent, email received, logged events, logged timeline, Website activity, logged Websites visited, application usage; log of applications run, documents opened, saved documents, files opened, files viewed, cut, cut and paste, scrolling, navigating, and setting a bookmark. In further implementations, the access information may include data indicative of a computing system environment, a local computing system interaction associated with the client-side computing device, a network interaction including bulk content downloaded to form a page, a turning of visibility tags on and off, and/or an interactive environment.

As mentioned above, in some implementations, the determining a determined influence of the electronic accessed content on the involvement between the accessor and the third party based at least partially on the access information and the involvement information at 440 may include determining whether the website accessed by the consumer using the browser was the primary reason the consumer purchased the good or service from the vendor, or determining whether the cell phone user's eventual purchase was attributable to a podcast that was downloaded by the user.

Figure 6:
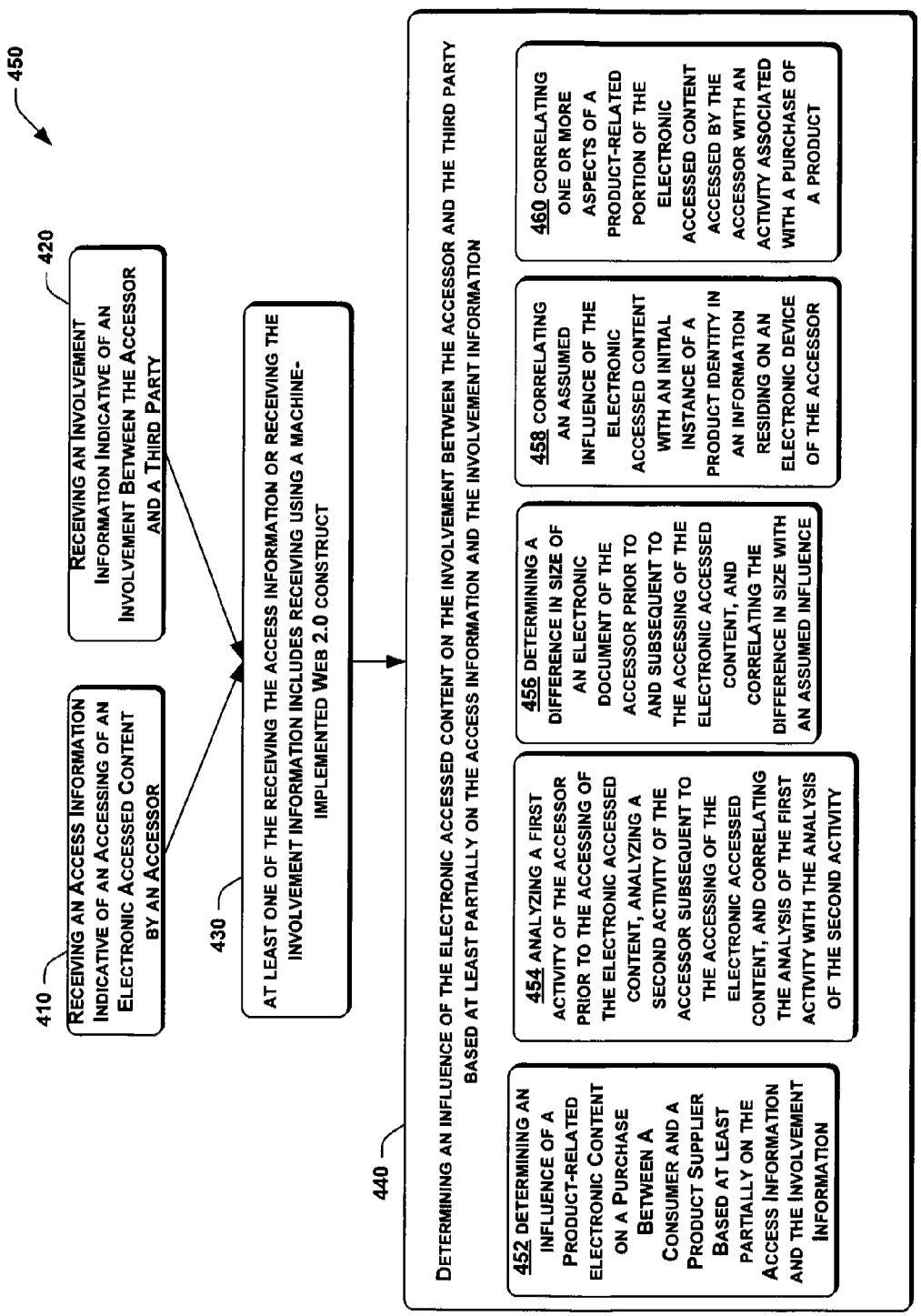

It will be appreciated that determining a determined influence of the electronic accessed content on the involvement between the accessor and the third party based at least partially on the access information and the involvement information at 440 may occur in a variety of ways. For example, in a method 450 as shown in FIG. 6, determining a determined influence of the electronic accessed content on the involvement between the accessor and the third party based at least partially on the access information and the involvement information at 440 may include determining an influence of a product-related electronic content on a purchase between a consumer and a product supplier based at least partially on the access information and the involvement information at 452 (e.g. determining that a last-accessed website that promoted a particular product was the most influential in the purchaser's decision to purchase the product). Similarly, determining a determined influence of the electronic accessed content on the involvement between the accessor and the third party based at least partially on the access information and the involvement information at 440 may include analyzing a first activity of the accessor prior to the accessing of the electronic accessed content, analyzing a second activity of the accessor subsequent to the accessing of the electronic accessed content, and correlating the analysis of the first activity with the analysis of the second activity at 454 (e.g. analyzing a first length of time spent accessing a first website, analyzing a second length of time spent accessing a second website, and correlating the first and second lengths of time).

In further embodiments, determining a determined influence of the electronic accessed content on the involvement between the accessor and the third party based at least partially on the access information and the involvement information at 440 may include determining a difference in size of an electronic document of the accessor prior to and subsequent to the accessing of the electronic accessed content and correlating the difference in size with an assumed influence at 456. For example, in some embodiments, a size of a note-taking document related to an accessor's eventual purchase may be reviewed after the accessor has accessed a first website and a second website, and the relative growth of the note-taking document after each of the first and second websites may be assumed to be directly proportional to the influence of each website, respectively.

In further embodiments, determining a determined influence of the electronic accessed content on the involvement between the accessor and the third party based at least partially on the access information and the involvement information at 440 may include correlating an assumed influence of the electronic accessed content with an initial instance of a product identity in an information residing on an electronic device of the accessor at 458. For example, in some embodiments, an electronic content containing a first mention or appearance of a product eventually purchased by an accessor may be assumed to be the most influential in the accessor's purchase decision. Similarly, the first mention or appearance of a product may be determined from a note-taking document, a cache memory, a browsing history, or any other suitable information source.

Similarly, in further embodiments, determining a determined influence of the electronic accessed content on the involvement between the accessor and the third party based at least partially on the access information and the involvement information at 440 may include correlating one or more aspects of a product-related portion of the electronic accessed content accessed by the accessor with an activity associated with a purchase of a product at 460 (e.g. correlating electronic signals indicating a user's accessing of graphical content related to a product, and an eventual registration of a newly-purchased product from a supplier).

Figure 7:
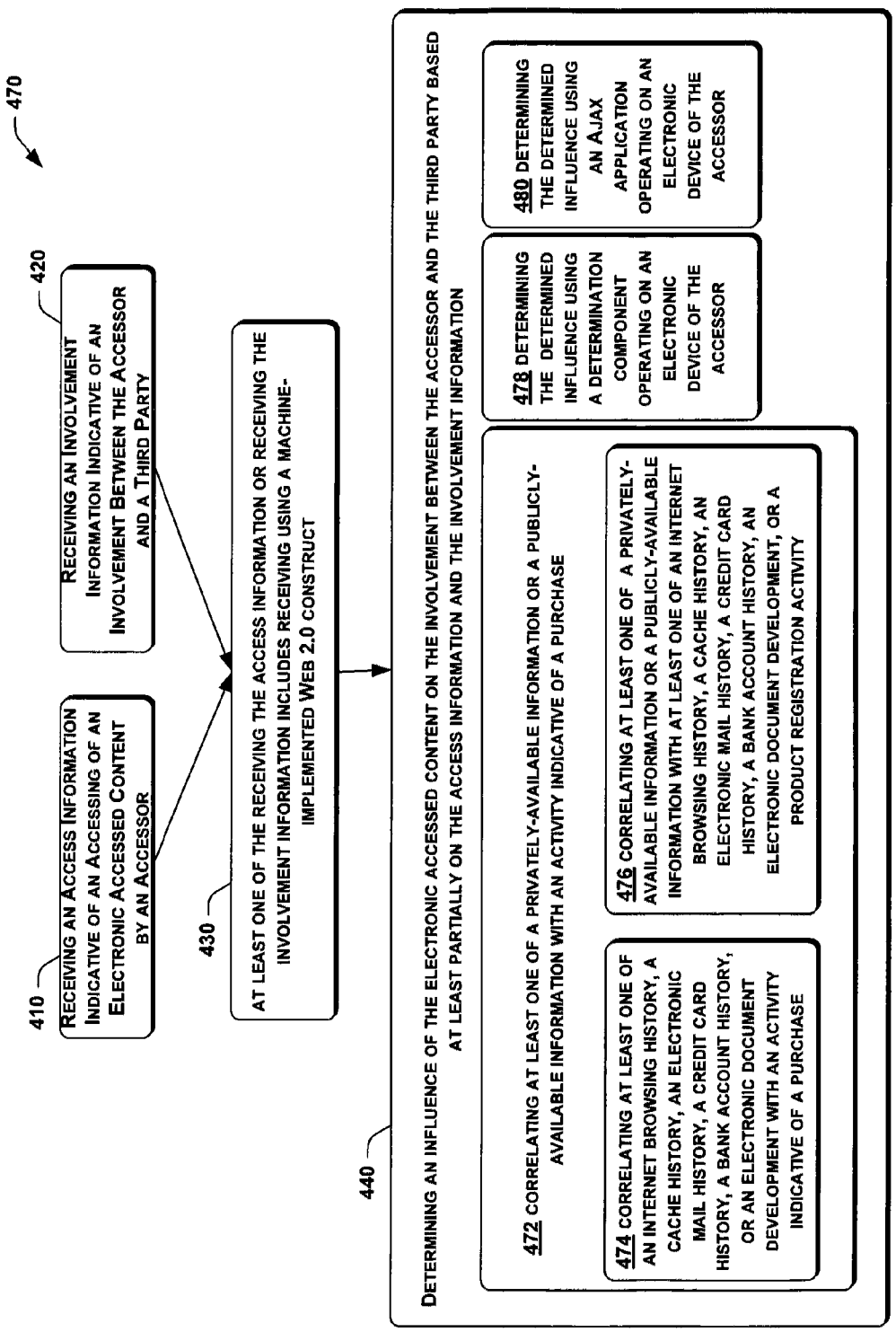

As shown in FIG. 7, in further embodiments, determining a determined influence of the electronic accessed content on the involvement between the accessor and the third party based at least partially on the access information and the involvement information at 440 may include correlating at least one of a privately-available information or a publicly-available information with an activity indicative of a purchase at 472 (e.g. correlating a cookie or other evidence of browsing history with a credit card purchase record). For example, in some implementations, correlating at least one of a privately-available information or a publicly-available information with an activity indicative of a purchase at 472 may include correlating at least one of an internet browsing history, a cache history, an electronic mail history, a credit card history, a bank account history, or an electronic document development with an activity indicative of a purchase at 474 (e.g. correlating a browsing history of a last-visited website with an email purchase confirmation).

Similarly, in further embodiments, correlating at least one of a privately-available information or a publicly-available information with an activity indicative of a purchase at 472 may include correlating at least one of a privately-available information or a publicly-available information with at least one of an interne browsing history, a cache history, an electronic mail history, a credit card history, a bank account history, an electronic document development, or a product registration activity at 476 (e.g. correlating a browsing history of a last-visited website with an electronic purchase record shown in a bank statement).

In further embodiments, determining a determined influence of the electronic accessed content on the involvement between the accessor and the third party based at least partially on the access information and the involvement information at 440 may include determining the determined influence using a determination component operating on an electronic device of the accessor at 478 (e.g. determining the determined influence using an influence determination software package operating on the purchaser's laptop computer).

Similarly, in further embodiments, determining a determined influence of the electronic accessed content on the involvement between the accessor and the third party based at least partially on the access information and the involvement information at 440 may include determining the determined influence using an Ajax application operating on an electronic device of the accessor at 480 (e.g. determining the determined influence using an Ajax component operating on the purchaser's personal data assistant).

Figure 8:
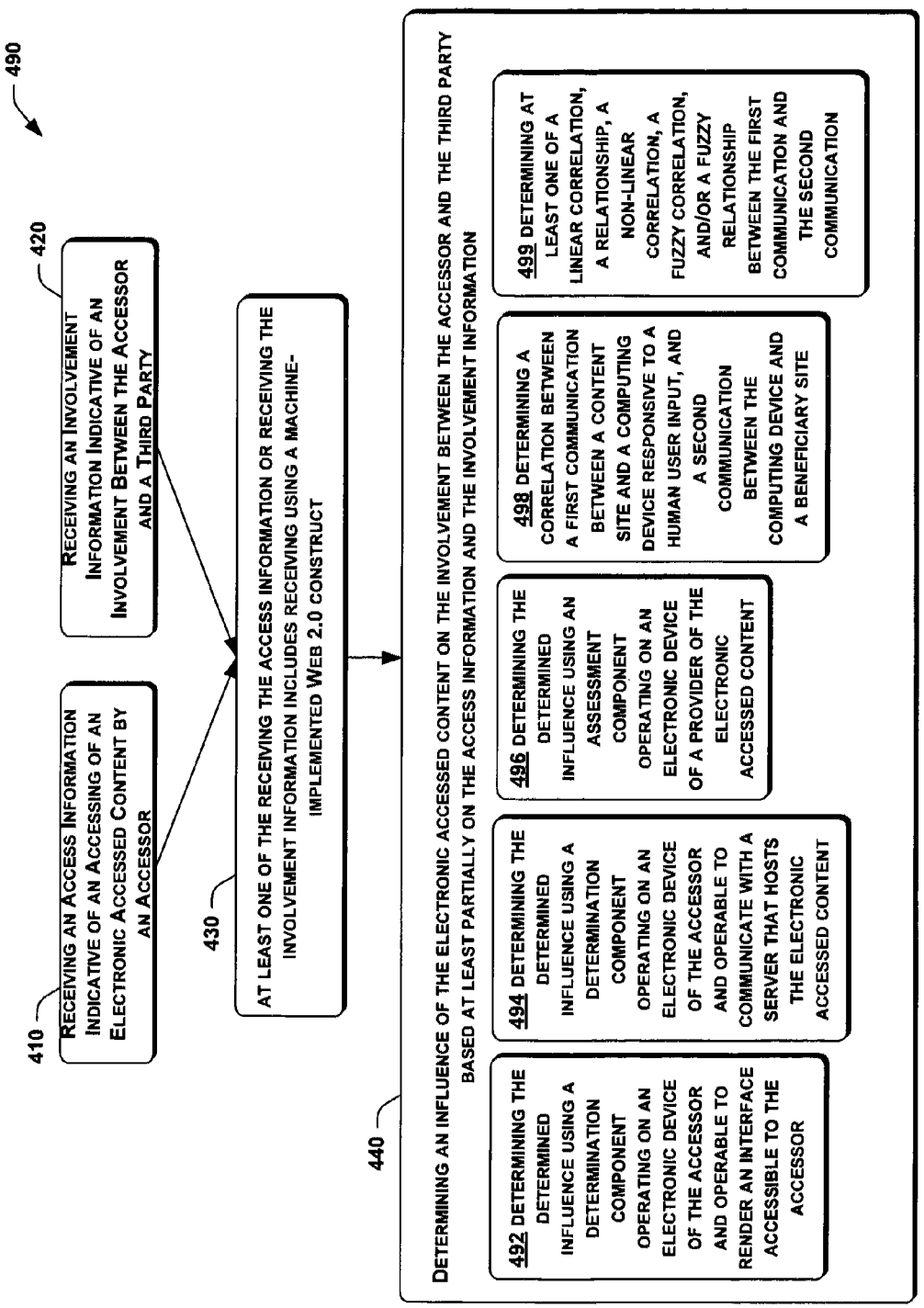

As shown in FIG. 8, in further embodiments, determining a determined influence of the electronic accessed content on the involvement between the accessor and the third party based at least partially on the access information and the involvement information at 440 may include determining the determined influence using a determination component operating on an electronic device of the accessor and operable to render an interface accessible to the accessor at 492 (e.g. determining the determined influence using a software component that detects a purchase by the accessor and provides a display requesting the purchaser's input on the electronic content that influenced the purchase).

In further embodiments, determining a determined influence of the electronic accessed content on the involvement between the accessor and the third party based at least partially on the access information and the involvement information at 440 may include determining the determined influence using a determination component operating on an electronic device of the accessor and operable to communicate with a server that hosts the electronic accessed content at 494 (e.g. determining the determined influence using a software component that detects a purchase by the accessor and transmits information related to the purchase to one or more servers that hosted electronic content accessed by the purchaser prior to the purchase).

In further embodiments, determining a determined influence of the electronic accessed content on the involvement between the accessor and the third party based at least partially on the access information and the involvement information at 440 may include determining the determined influence using an assessment component operating on an electronic device of a provider of the electronic accessed content at 496 (e.g. determining the determined influence using an influence determination software package operating on the server that provided the content related to the purchased product).

In further embodiments, determining a determined influence of the electronic accessed content on the involvement between the accessor and the third party based at least partially on the access information and the involvement information at 440 may include determining a correlation between a first communication between a content site and a computing device responsive to a human user input, and a second communication between the computing device and a beneficiary site at 498 (e.g. determining a correlation between an amount of information "clicked on" or reviewed by the accessor related to a product purchased by the accessor and a Paypal order confirmation message indicating a purchase of the product).

In further embodiments, determining a determined influence of the electronic accessed content on the involvement between the accessor and the third party based at least partially on the access information and the involvement information at 440 may include determining at least one of a linear correlation, a relationship, a non-linear correlation, a fuzzy correlation, and/or a fuzzy relationship between the first communication and the second communication at 499 (e.g. determining a determined influence assuming a direct relationship between a volume of electronic content accessed by a purchaser and a presumed influence level of the electronic content).

Figure 9:
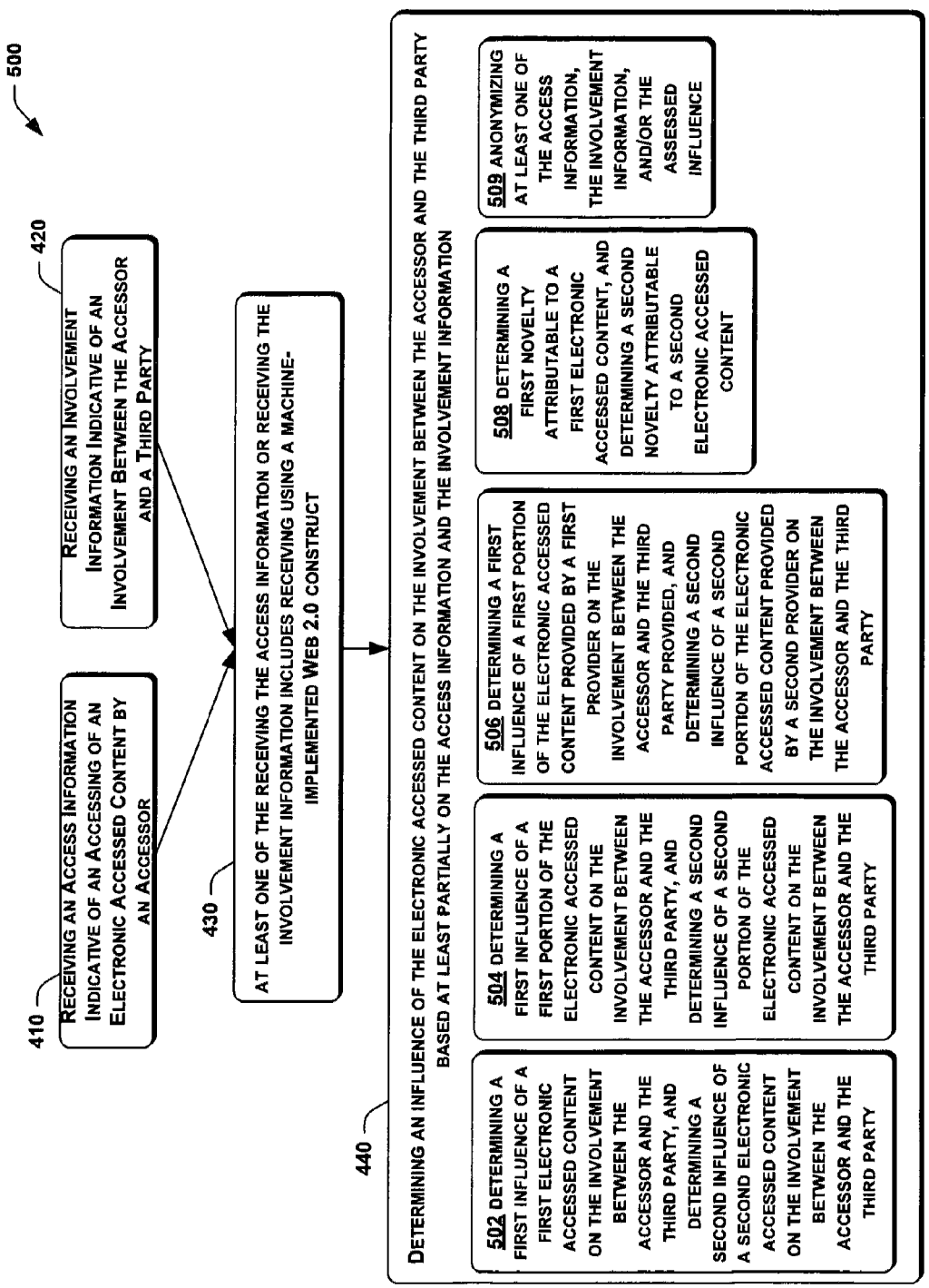

As shown in FIG. 9, in further embodiments, determining a determined influence of the electronic accessed content on the involvement between the accessor and the third party based at least partially on the access information and the involvement information at 440 may include determining a first influence of a first electronic accessed content on the involvement between the accessor and the third party, and determining a second influence of a second electronic accessed content on the involvement between the accessor and the third party at 502 (e.g. determining a first influence based on a first time period spent by an accessor accessing a first electronic content provided by a marketer, and a second influence based on a second time period spent by the accessor accessing a second electronic content provided by the marketer).

In further embodiments, determining a determined influence of the electronic accessed content on the involvement between the accessor and the third party based at least partially on the access information and the involvement information at 440 may include determining a first influence of a first portion of the electronic accessed content on the involvement between the accessor and the third party, and determining a second influence of a second portion of the electronic accessed content on the involvement between the accessor and the third party at 504 (e.g. determining a first influence of a first product review article provided by a marketer and reviewed by a purchaser, and a second influence based on a second product review article provided by the marketer and reviewed by the purchaser).

In further embodiments, determining a determined influence of the electronic accessed content on the involvement between the accessor and the third party based at least partially on the access information and the involvement information at 440 may include determining a first influence of a first portion of the electronic accessed content provided by a first provider on the involvement between the accessor and the third party provided, and determining a second influence of a second portion of the electronic accessed content provided by a second provider on the involvement between the accessor and the third party at 506 (e.g. determining a first influence of an endorsement of a first service by a first spokesperson, and determining a second influence of another endorsement of a second service by a second spokesperson, where an accessor eventually purchases at least one of the first or second services).

In further embodiments, determining a determined influence of the electronic accessed content on the involvement between the accessor and the third party based at least partially on the access information and the involvement information at 440 may include determining a first novelty attributable to a first electronic accessed content, and determining a second novelty attributable to a second electronic accessed content at 508 (e.g. determining a first influence of a first commentator's viewpoint and determining a second influence of a second commentator's viewpoint, where an accessor eventually submits a purchase order consistent with either the first viewpoint or the second viewpoint).

In still further embodiments, determining a determined influence of the electronic accessed content on the involvement between the accessor and the third party based at least partially on the access information and the involvement information at 440 may include anonymizing at least one of the access information, the involvement information, and/or the assessed influence at 509 (e.g. removing any information that may be used to identify an accessor/purchaser from information provided to a determination component operating on a server of a provider of an electronic content).

Figure 10:
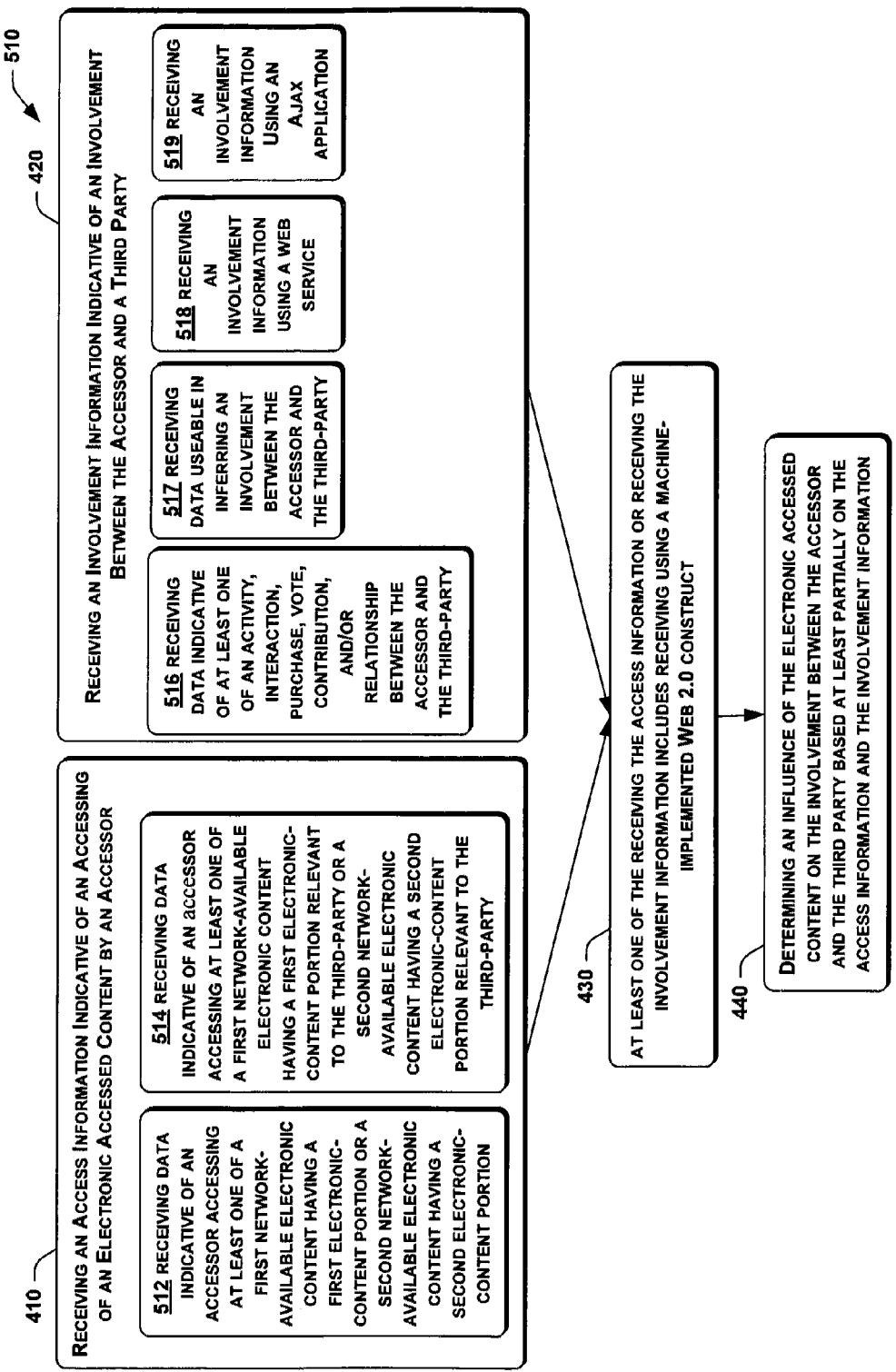

It will be appreciated that receiving an access information indicative of an accessing of an electronic accessed content by an accessor at 410 may occur in a variety of ways. For example, in a method 510 as shown in FIG. 10, receiving an access information indicative of an accessing of an electronic accessed content by an accessor at 410 may include receiving data indicative of an accessor accessing at least one of a first network-available electronic content having a first electronic-content portion or a second network-available electronic content having a second electronic-content portion at 512 (e.g. receiving data indicative of a media player viewing a mashup that provides a first viewable podcast and a second viewable podcast).

In further embodiments, receiving an access information indicative of an accessing of an electronic accessed content by an accessor at 410 may include receiving data indicative of an accessor accessing at least one of a first network-available electronic content having a first electronic-content portion relevant to the third-party or a second network-available electronic content having a second electronic-content portion relevant to the third-party at 514 (e.g. receiving data indicative that an accessor accessed a first article for a first time period and a second article for a second time period, receiving data indicative that an accessor recorded a first quantity of notes while reviewing a first article and a second quantity of notes while reviewing a second article).

Similarly, it will be appreciated that receiving an involvement information indicative of an involvement between the accessor and a third party at 420 may occur in a variety of ways. For example, with continued reference to FIG. 10, in some embodiments, receiving an involvement information indicative of an involvement between the accessor and a third party at 420 may include receiving data indicative of at least one of an activity, interaction, purchase, vote, contribution, and/or relationship between the accessor and the third-party at 516.

In further embodiments, receiving an involvement information indicative of an involvement between the accessor and a third party at 420 may include receiving data useable in inferring an involvement between the accessor and the third-party at 517 (e.g. receiving a cookie placed by the third-party's website on the accessor's device indicative of a consumer transaction). Similarly, in further embodiments, receiving an involvement information indicative of an involvement between the accessor and a third party at 420 may include receiving an involvement information using a web service at 518 (e.g. receiving a report from a web service that performs tracking and reporting of durations of time spent by web browsers accessing websites). In still further embodiments, receiving an involvement information indicative of an involvement between the accessor and a third party at 420 may include receiving an involvement information using an Ajax (Asynchronous JavaScript and XML (Extensible Markup Language)) application at 519 (e.g. receiving a report using an Ajax application that documents and reports podcasts downloaded to a platform or device).

Figure 11:
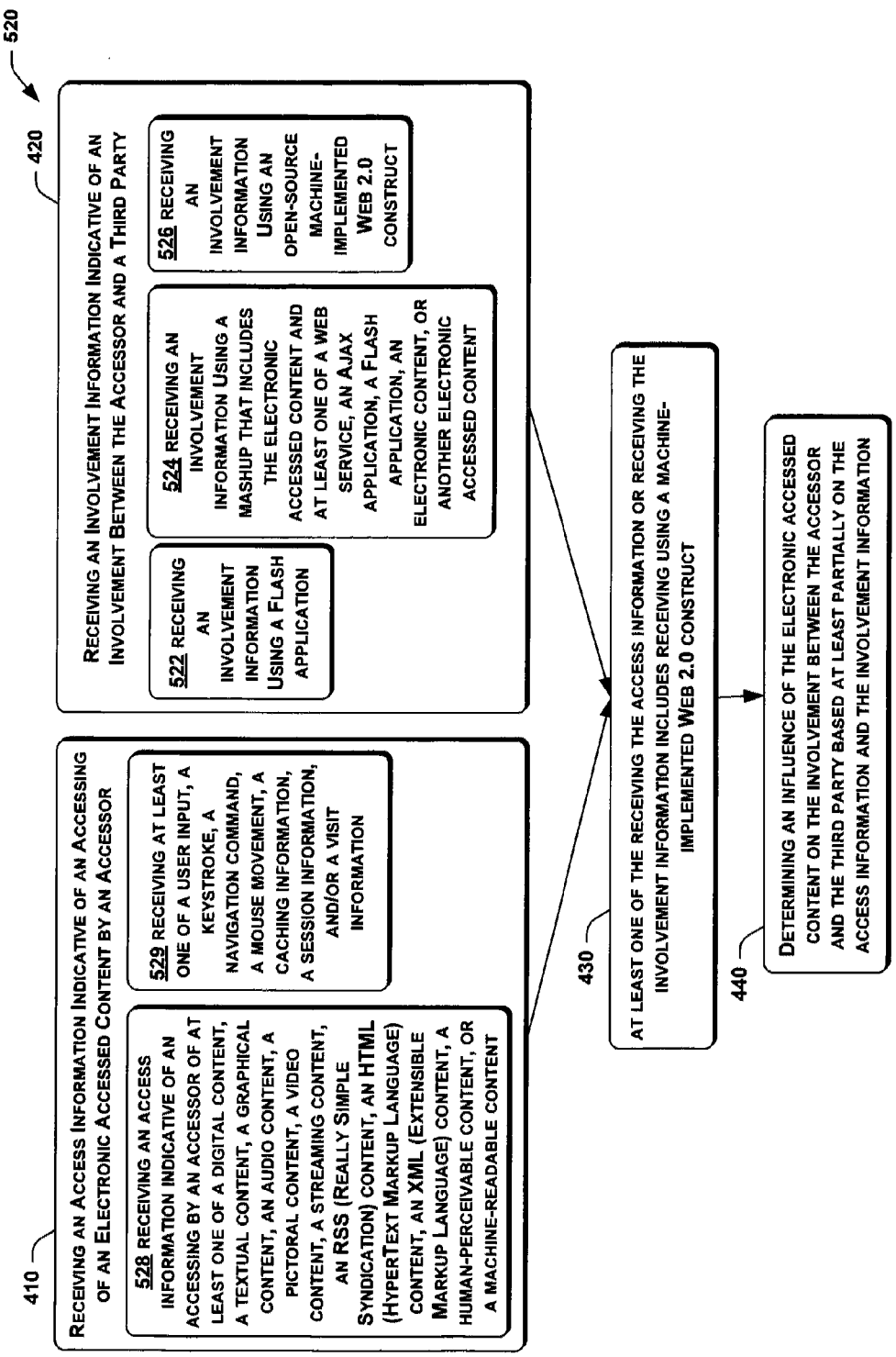

As shown in FIG. 11, in some embodiments, receiving an involvement information indicative of an involvement between the accessor and a third party at 420 may include receiving an involvement information using a Flash application at 522 (e.g. receiving a report from a Flash application that provides enhanced interactive capabilities and also monitors web browsing activities). Similarly, in further embodiments, receiving an involvement information indicative of an involvement between the accessor and a third party at 420 may include receiving an involvement information using a mashup that includes the electronic accessed content and at least one of a web service, an Ajax application, a Flash application, an electronic content, or another electronic accessed content at 524 (e.g. receiving a purchase confirmation message from a mashup that provides audio or visual content to a viewer and a Flash application that provides animation and that reports online purchasing activities).

In further embodiments, receiving an involvement information indicative of an involvement between the accessor and a third party at 420 may include receiving an involvement information using an open-source machine-implemented Web 2.0 construct at 526 (e.g. receiving a feed of information from an open-source engine that monitors web browsing activities, or an open-source application that documents access time durations). More specifically, in further embodiments, receiving an access information indicative of an accessing of an electronic accessed content by an accessor at 410 may include receiving an access information indicative of an accessing by an accessor of at least one of a digital content, a textual content, a graphical content, an audio content, a pictorial content, a video content, a streaming content, an RSS (Really Simple Syndication) content, an HTML (HyperText Markup Language) content, an XML (Extensible Markup Language) content, a human-perceivable content, or a machine-readable content at 528. Similarly, in further embodiments, receiving an access information indicative of an accessing of an electronic accessed content by an accessor at 410 may include receiving at least one of a user input, a keystroke, a navigation command, a mouse movement, a caching information, a session information, and/or a visit information at 529.

Figure 12:
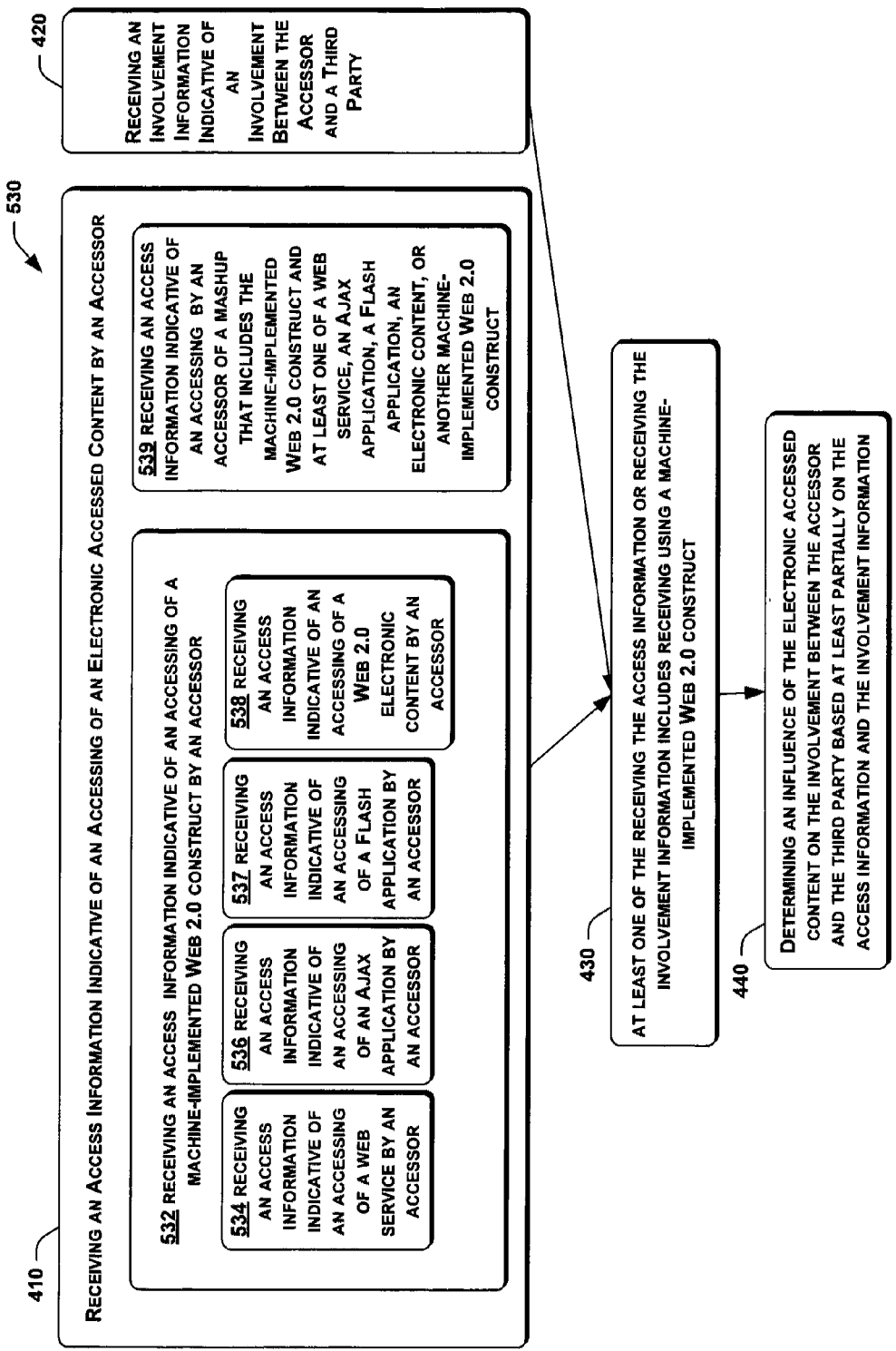

As shown in FIG. 12, in some embodiments, receiving an access information indicative of an accessing of an electronic accessed content by an accessor at 410 may include receiving an access information indicative of an accessing of a machine-implemented Web 2.0 construct by an accessor at 532 (e.g. receiving a summary indicating a user's shopping activity including viewing of visual content from a mashup that includes a Web-based information service). In further embodiments, receiving an access information indicative of an accessing of an electronic accessed content by an accessor at 410 may include receiving an access information indicative of an accessing of a web service by an accessor at 534 (e.g. receiving information indicating a user's viewing of product-related information from an RSS feed of consumer-oriented information from a Web-based information service).

Similarly, in further embodiments, receiving an access information indicative of an accessing of an electronic accessed content by an accessor at 410 may include receiving an access information indicative of an accessing of an Ajax (Asynchronous JavaScript and XML (Extensible Markup Language)) application by an accessor at 536 (e.g. receiving information indicating a PDA (Personal Data Assistant) access of an Ajax application from a website that provides Internet search services). In still further embodiments, receiving an access information indicative of an accessing of an electronic accessed content by an accessor at 410 may include receiving an access information indicative of an accessing of a Flash application by an accessor at 537 (e.g. receiving information indicating a computer access of a Flash application that provides animation of aspects of a product from a retailer).

In further embodiments, receiving an access information indicative of an accessing of an electronic accessed content by an accessor at 410 may include receiving an access information indicative of an accessing of a Web 2.0 electronic content by an accessor 538 (e.g. receiving information indicating a computer access of a mashup that includes an animation-related Flash application from a website that offers services for sale). Similarly, in further embodiments, receiving an access information indicative of an accessing of an electronic accessed content by an accessor at 410 may include receiving an access information indicative of an accessing by an accessor of a mashup that includes the machine-implemented Web 2.0 construct and at least one of a web service, an Ajax application, a Flash application, an electronic content, or another machine-implemented Web 2.0 construct at 539.

Figure 13:
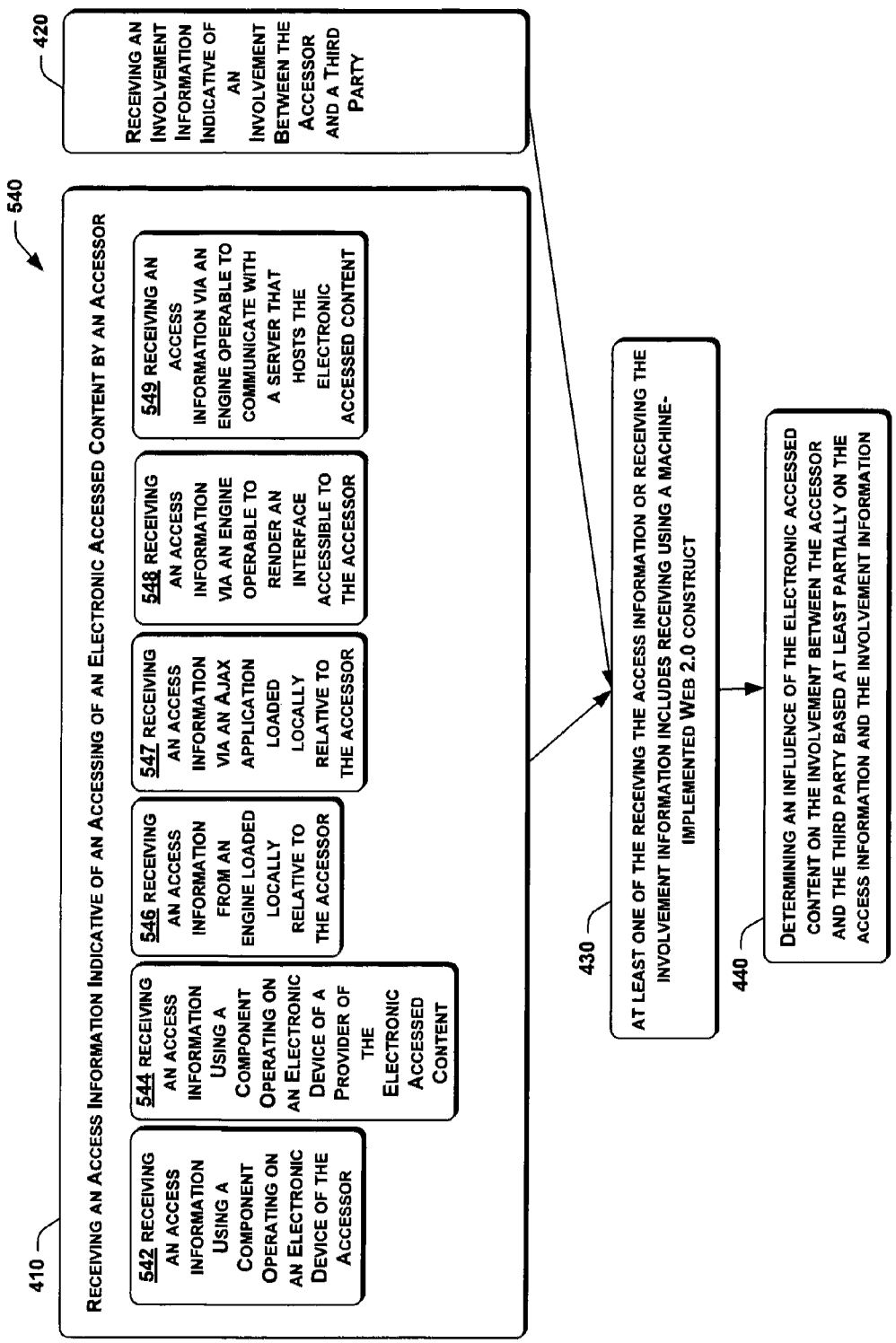

As shown in FIG. 13, in some embodiments, receiving an access information indicative of an accessing of an electronic accessed content by an accessor at 410 may include receiving an access information using a component operating on an electronic device of the accessor at 542 (e.g. receiving an access report using an asynchronous engine loaded on an accessor's mobile device). In further embodiments, receiving an access information indicative of an accessing of an electronic accessed content by an accessor at 410 may include receiving an access information using a component operating on an electronic device of a provider of the electronic accessed content at 544 (e.g. receiving an access report using a software package loaded on a server that hosts an accessed electronic content).

Similarly, in further embodiments, receiving an access information indicative of an accessing of an electronic accessed content by an accessor at 410 may include receiving an access information from an engine loaded locally relative to the accessor at 546. (e.g. receiving an access report using a software package loaded on an accessor's laptop). In further embodiments, receiving an access information indicative of an accessing of an electronic accessed content by an accessor at 410 may include receiving an access information via an Ajax application loaded locally relative to the accessor at 547 (e.g. receiving a report including sites visited and duration of visits using an Ajax package loaded on an accessor's cell phone).

In further embodiments, receiving an access information indicative of an accessing of an electronic accessed content by an accessor at 410 may include receiving an access information via an engine operable to render an interface accessible to the accessor at 548 (e.g. receiving a browsing summary using a component that presents a menu for user-provided influence input). Similarly, in further embodiments, receiving an access information indicative of an accessing of an electronic accessed content by an accessor at 410 may include receiving an access information via an engine operable to communicate with a server that hosts the electronic accessed content at 549 (e.g. receiving a periodic browsing report from a software component that transmits the periodic browsing report to one or more servers that host product-related information).

Figure 14:
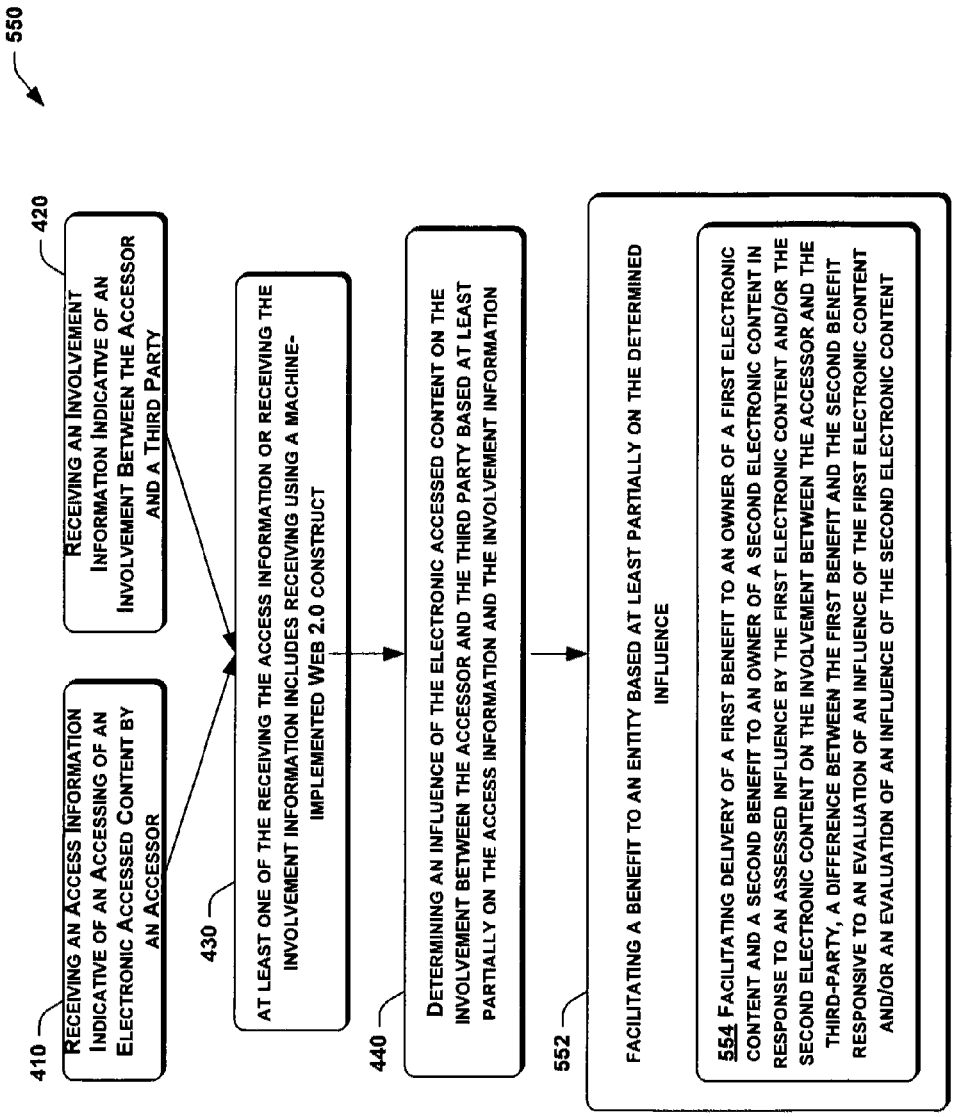

Additional embodiments and aspects of processes and systems in accordance with the present disclosure are depicted in FIG. 14, which shows a flowchart of a method 550 that includes receiving an access information indicative of an accessing of an electronic accessed content by an accessor at 410, receiving an involvement information indicative of an involvement between the accessor and a third party at 420, wherein at least one of receiving the access information or receiving the involvement information includes receiving using a machine-implemented Web 2.0 construct at 430, and determining a determined influence of the electronic accessed content on the involvement between the accessor and the third party based at least partially on the access information and the involvement information at 440. The method 550 further includes facilitating a benefit to an entity based at least partially on the determined influence at 552 (e.g. providing compensation to a provider of a product-review article based on a determined influence of the article, authorizing a credit for future goods or services to an owner of an electronic content based on a determined influence that exceeds a predetermined threshold, providing a discount on airline flights based on a determined influence of a favorable travel recommendation).

It will be appreciated that the facilitating a benefit to an entity based at least partially on the determined influence at 552 may be implemented in a variety of ways. For example, in some embodiments, facilitating a benefit to an entity based at least partially on the determined influence at 552 may include facilitating delivery of a first benefit to an owner of a first electronic content and a second benefit to an owner of a second electronic content in response to an assessed influence by the first electronic content and/or the second electronic content on the involvement between the accessor and the third-party, a difference between the first benefit and the second benefit responsive to an evaluation of an influence of the first electronic content and/or an evaluation of an influence of the second electronic content at 554 (e.g. providing a relatively smaller rate reduction on goods to a first author of a consumer report providing a moderately-positive endorsement of a product, and a relatively larger rate reduction on goods to a second author of a consumer report providing a highly-positive endorsement of the product, the difference between the larger and smaller rate reductions being based on an evaluation of the relative influence of the consumer reports by the first and second authors).

It should be appreciated that the processes and methods described above with reference to FIGS. 5-14 are merely illustrative of a few of the many possible processes and methods in which the teachings of the present disclosure may be implemented, and that the teachings herein are not limited to the particular processes and methods described above.

Additional Exemplary Systems and Environments

Figure 15:
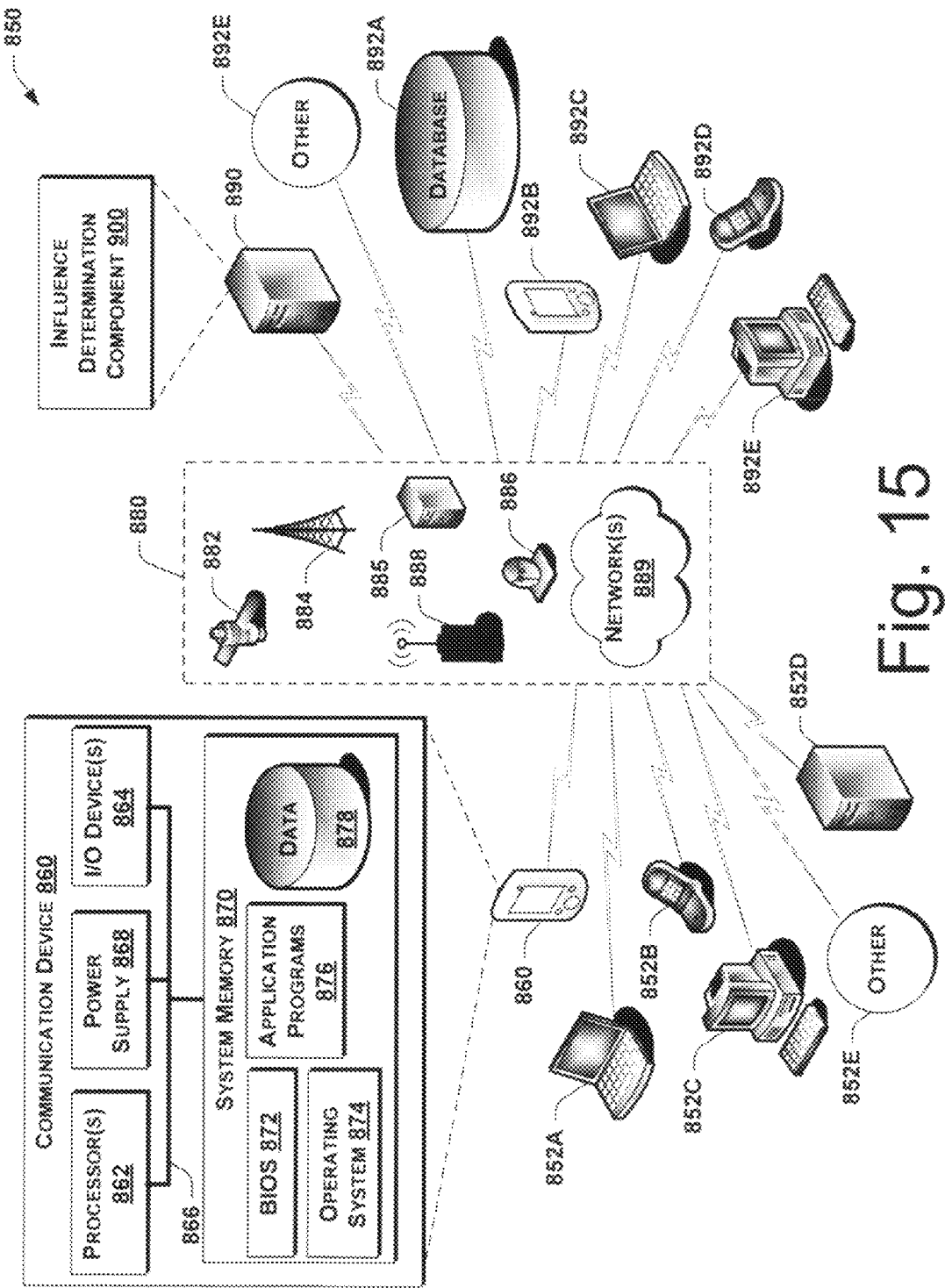
FIGS. 15-21 illustrate exemplary embodiments of alternate computing systems and environments in which embodiments may be implemented.

Additional aspects of exemplary systems and environments for implementing aspects of methods and processes in accordance with the present disclosure will now be described. For example, FIG. 15 illustrates an exemplary environment 850 in which further embodiments may be implemented. In this implementation, the environment 850 includes a communication device 860 that communicates via a communication infrastructure 880 with an influence determiner 890. The influence determiner 890 includes an influence determination component 900 in accordance with the teachings of the present disclosure. In some implementations, the communication device 860 may bypass the infrastructure 880 and communicate directly with the influence determiner 890, or may simply communicate with the infrastructure 880 itself.

As further shown in FIG. 15, in some implementations, the environment 850 may include one or more additional communication devices 852. In will be appreciated that the communication devices 860, 852 may be a wide variety of suitable devices. For example, in some implementations, the communication device 860 (or 852) may be a hand-held device (860) (e.g. personal data assistant (PDA), global positioning system (GPS), radio, television, audio device, audio-visual device, mobile communicator, signal processor, etc.), a laptop or mobile computer (852A), a cellular telephone (852B), a desktop computer (852C), a server (852D), or any other suitable device (852E) having the desired communication capabilities.

In some implementations, the influence determiner 890 may provide electronic content for access by the communication devices 860, 852. In further implementations, the environment 850 may include one or more content providers 892. The content providers 892 (and the influence determiner 890) may include a wide variety of suitable devices. For example, in some implementations, the content providers 892 may include a server (890), a database (892A), a hand-held device (892B) (e.g. personal data assistant (PDA), global positioning system (GPS), radio, television, audio device, audio-visual device, mobile communicator, signal processor, etc.), a laptop or mobile computer (892C), a cellular telephone (892D), a desktop computer (892E), or any other suitable device (892E) having the desired content-providing capabilities.

In some implementations, the infrastructure 880 may include a variety of suitable components that cooperatively provide a wired or wireless communications functionality. Various exemplary communication components of the infrastructure 880 are shown in FIG. 15 for illustrative purposes. For example, in some implementations, the infrastructure 880 may include one or more of the following: a communications satellite 882, an antenna tower 884, a computer 885, a communications dish 886, a signal carrier 888, and one or more networks 889. Alternately, other communications components may be used. In particular implementations, for example, the infrastructure 880 may include components that make up a Core Network (CN) and/or a UMTS Terrestrial Radio Access Network (UTRAN) of a modern UMTS (Universal Mobile Telecommunication System).

As further illustrated in FIG. 15, in some implementations, the communication device 860 includes one or more processors 862 and one or more input/output (I/O) devices 864 coupled to a system memory 870 by a bus 866. Power may be provided to the components of the communication device 860 via a power supply 868. The system bus 866 of the communication device 860 represents any of the several types of bus structures, including a memory bus or memory controller, a peripheral bus, an accelerated graphics port, and a processor or local bus using any of a variety of bus architectures. The I/O component 864 may be configured to operatively communicate with one or more external components, such as one or more components of the infrastructure 880, one or more other communication devices 852, the influence determiner 890, one or more content providers 892, or other communications networks, such a cellular telephone network, a satellite network, an information network (e.g., Internet, intranet, cellular network, cable network, fiber optic network, LAN, WAN, etc.), an infrared or radio wave communication network, or any other suitable network.

The system memory 870 may include computer-readable media configured to store data and/or program modules for implementing the techniques disclosed herein that are immediately accessible to and/or presently operated on by the processor 862. For example, the system memory 870 may store a basic input/output system (BIOS) 872, an operating system 874, one or more application programs 876 (e.g. a web browser, a communications program, etc.), and program data 878 that can be accessed by the processor 872 for performing various tasks desired by a user of the communication device 860. The other communication devices 852 of the environment 850 may have an internal structure similar to (or different than) that of the communication device 860 shown in FIG. 15.

The computer-readable media included in the system memory 870 can be any available media that can be accessed by the device 860, including computer storage media and communication media. Computer storage media may include both volatile and nonvolatile, removable and non-removable media implemented in any method or technology for storage of information such as computer-readable instructions, data structures, program modules, or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVD) or other optical disk storage, magnetic cassettes, magnetic tape, magnetic disk storage or other magnetic storage devices, or any other medium, including paper, punch cards and the like, which can be used to store the desired information and which can be accessed by the communication device 860.

Similarly, communication media may include computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF (radio-frequency), infrared and other wireless media. Combinations of any of the above should also be included within the scope of computer readable media.

Generally, program modules executed on the communication devices 860, 852, the influence determiner 890, or the content providers 892 (FIG. 15) may include routines, programs, objects, components, data structures, etc., for performing particular tasks or implementing particular abstract data types. These program modules and the like may be executed as a native code or may be downloaded and executed such as in a virtual machine or other just-in-time compilation execution environments. Typically, the functionality of the program modules may be combined or distributed as desired in various implementations.

Figure 16:
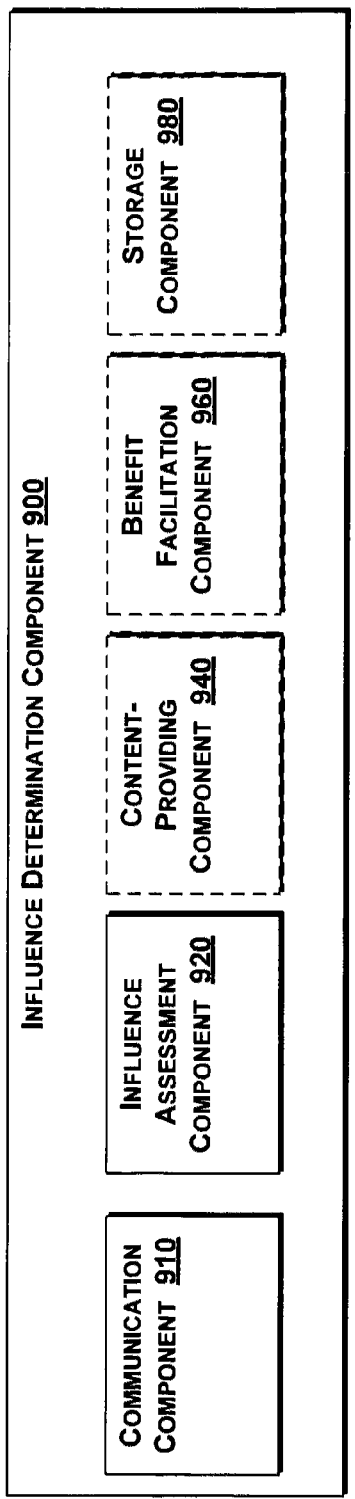

FIG. 16 shows an exemplary implementation of the influence determination component 900 of the influence determiner 890 of FIG. 15. Although the influence determination component 900 is depicted as being resident on the influence determiner 890 in FIG. 15, in some implementations, one or more portions or functionalities of the influence determination component 900 may be distributed to other portions of the environment 850 (e.g. infrastructure 880, communication devices 860, 852, content providers 892, etc.). More specifically, in further implementations, the influence determination component 900 may reside on an electronic device of an accessor, or an electronic device of a provider of electronic content, or on any other suitable component of the environment 850.

As shown in FIG. 16, in some implementations, the influence determination component 900 may include a communication component 910 operatively communicating with an influence assessment component 930. In further implementations, the influence determination component 900 may also include a content-providing component 940, a benefit facilitation component 960, and a storage component 980. The various components 910, 920, 940, 960, 980 of the influence determination component 900 may operatively communicate using known techniques to accomplish the desired functionalities described herein. In addition, unless otherwise specified, it will be appreciated that the various components 910, 920, 940, 960, 980 of the influence determination component 900 may be implemented using hardware, software, firmware, or combinations thereof.

Figure 17:
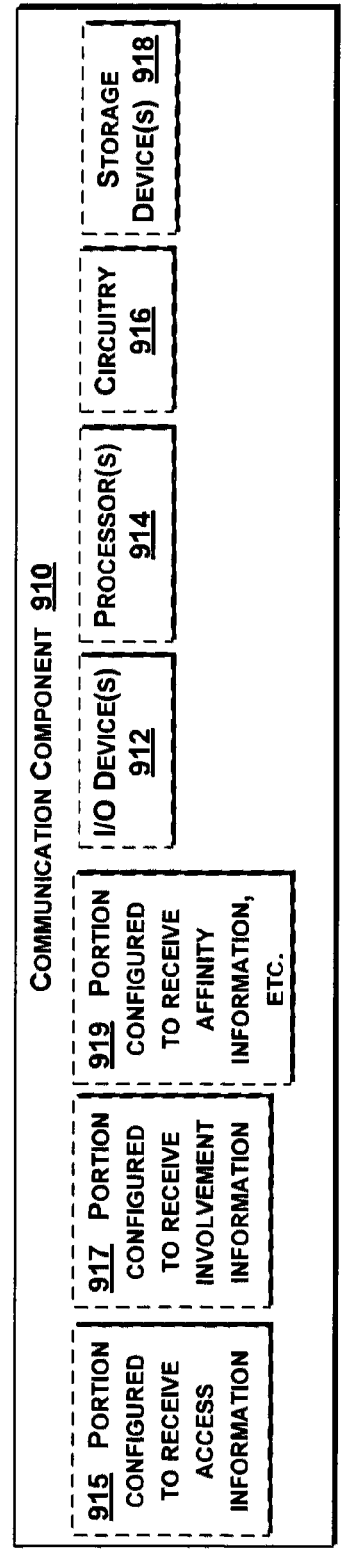

FIG. 17 illustrates an exemplary implementation of the communication component 910 of FIG. 16. In some implementations, the communication component 910 may include a portion 915 configured to receive access information, and a portion 917 configured to receive involvement information 917, as described more fully below. In some implementations, the portion 917 configured to receive involvement information is further configured to receive involvement information using a machine-implemented Web 2.0 construct, as described more fully below. In further implementations, the communication component 910 may include a portion 919 configured to receive affinity information, or any other desired information. Further possible implementations and aspects of the communication component 910 are described more fully below.

As further shown in FIG. 17, the communication component 910 may also include one or more I/O devices 912 (e.g. antennas, ports, etc.), processors 914, circuitry 916 (e.g. ASICs, signal conditioning, etc.), storage devices 918, or any other suitable desired sub-components or sub-systems to cooperatively perform the desired functionalities described herein. Although the portions and components of the communication component 910 are depicted in FIG. 17 as being separate portions and components for the sake of clarity, it should be appreciated that these portions and components are not necessarily separate, and may variously be combined or may have overlapping portions, components, or functionalities.

Figure 18:
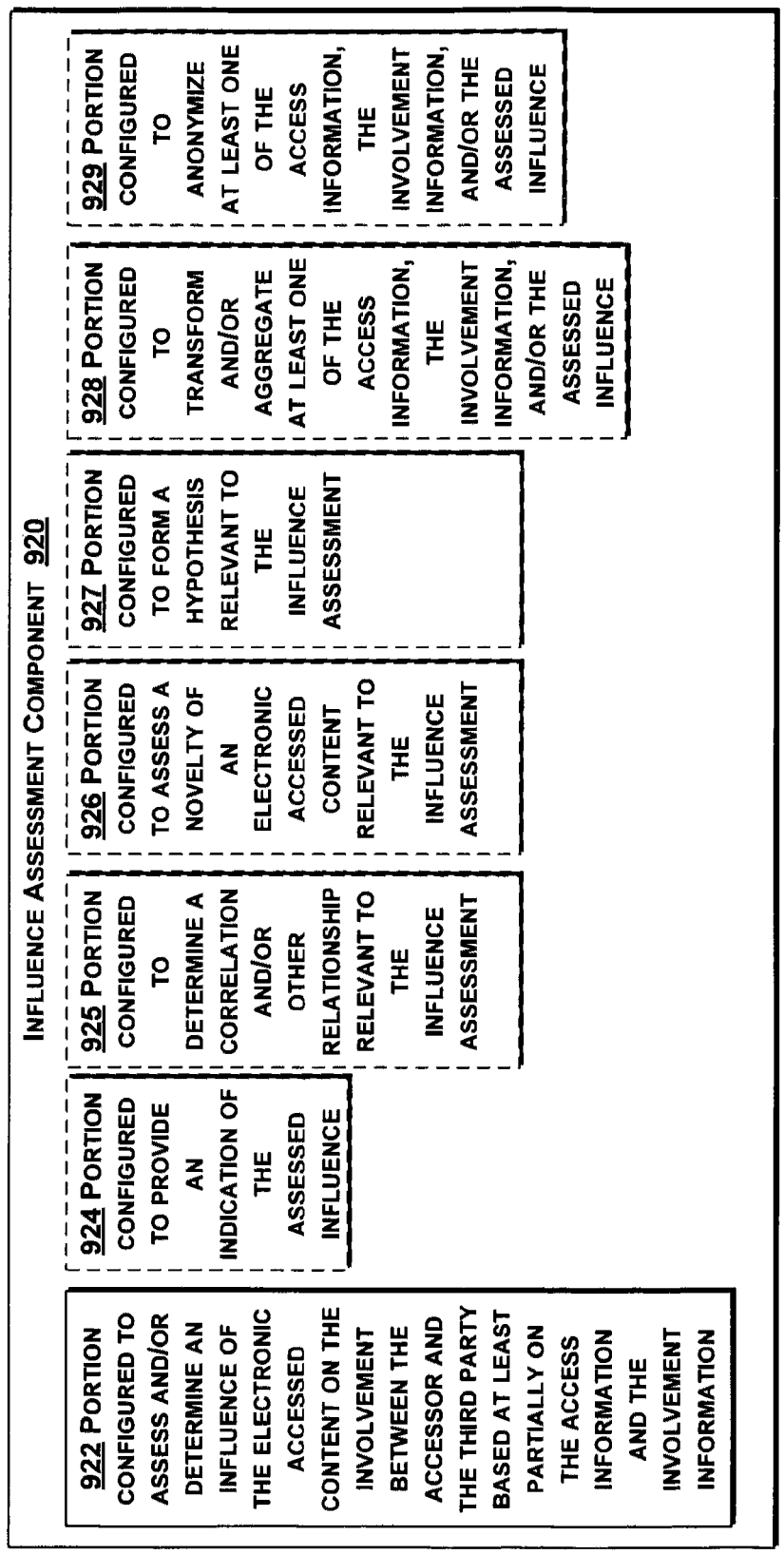

FIG. 18 shows an exemplary implementation of the influence assessment component 920 of FIG. 16. In some implementations, the influence assessment component 920 may include a portion 922 configured to assess and/or determine an influence of the electronic accessed content on the involvement between the accessor and the third party based at least partially on the access information and the involvement information. In further implementations, the influence assessment component 920 may include a portion 924 configured to provide an indication of the assessed influence. The influence assessment component 920 may also include a portion 925 configured to determine a correlation and/or other relationship relevant to the influence assessment (e.g. a correlation between a communication between a content site and a computing device responsive to a human user input, and a communication between the computing device and a beneficiary site).

In some implementations, the influence assessment component 920 may include a portion 926 configured to assess a novelty of an electronic accessed content relevant to the influence assessment. In further implementations, the influence assessment component 920 may include a portion 927 configured to form a hypothesis relevant to the influence assessment. Similarly, the influence assessment component 920 may include a portion 928 configured to transform and/or aggregate at least one of the access information, the involvement information, and/or the assessed influence. In some implementations, the influence assessment component 920 may include a portion 929 configured to anonymize at least one of the access information, the involvement information, and/or the assessed influence. Further possible implementations and aspects of the influence assessment component 920 are described more fully below.

Although such components are not shown in FIG. 18 for the sake of clarity, in some implementations, the influence assessment component 920 may also include one or more I/O devices 912 (e.g. antennas, ports, etc.), processors 914, circuitry 916 (e.g. ASICs, signal conditioning, etc.), or storage devices 918 (see FIG. 17). Again, although the portions and components of the influence assessment component 920 are depicted in FIG. 18 as being separate portions and components for the sake of clarity, it should be appreciated that these portions and components are not necessarily separate, and may variously be combined or may have overlapping portions, components, or functionalities.

Figure 19:
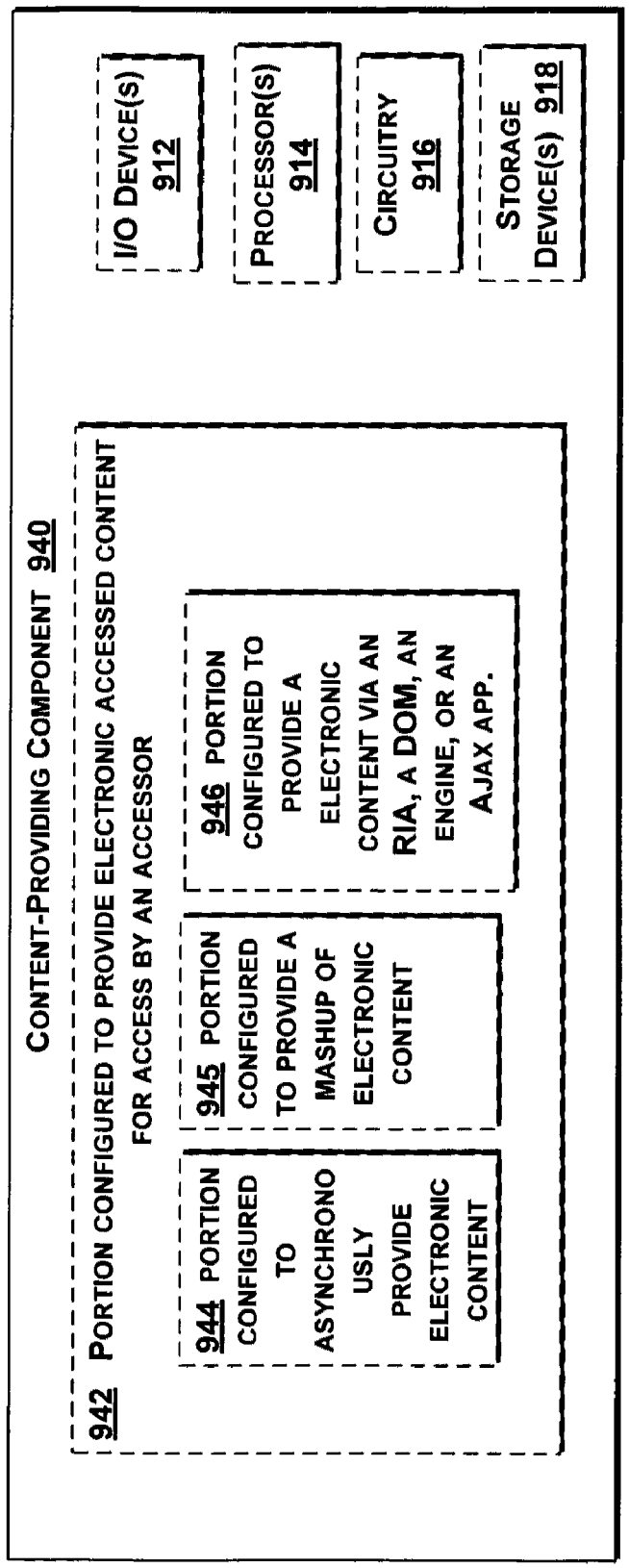

FIG. 19 shows an exemplary implementation of the content-providing component 940 of FIG. 16. In some implementations, the content-providing component 940 may include a portion 942 configured to provide electronic accessed content for access by an accessor. More specifically, in some implementations, the portion 942 configured to provide electronic accessed content for access by an accessor may include a portion 944 configured to asynchronously provide electronic content, or a portion 945 configured to provide a mashup of electronic content, a portion 946 configured to provide electronic content via a Rich Internet Application (RIA) (e.g. a Flash application, etc.), or a Document Object Model (DOM), or an engine, or an Ajax application, or other portions configured to provide electronic content in a variety of ways, as described more fully below. In addition, further possible implementations and aspects of the content-providing component 940 are described more fully below.

As shown in FIG. 19, the content-providing component 940 may also include one or more I/O devices 912 (e.g.

antennas, ports, etc.), processors 914, circuitry 916 (e.g. ASICs, signal conditioning, etc.), or storage devices 918. Again, although the portions and components of the content-providing component 940 are depicted in FIG. 19 as being separate portions and components for the sake of clarity, it should be appreciated that these portions and components are not necessarily separate, and may variously be combined or may have overlapping portions, components, or functionalities.

Figure 20:
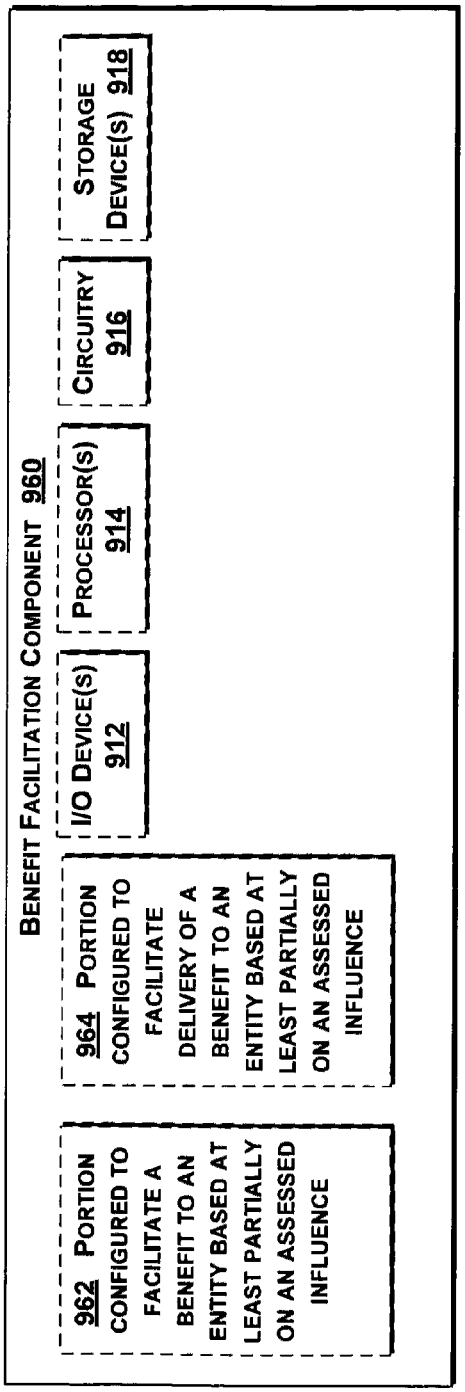

FIG. 20 shows an exemplary implementation of the benefit facilitation component 960 of FIG. 16. In some implementations, the benefit facilitation component 960 may include a portion 962 configured to facilitate a benefit to an entity based at least partially on an assessed influence. In further implementations, the benefit facilitation component 960 may include a portion 964 configured to facilitate delivery of a benefit to an entity based at least partially on an assessed influence. In addition, further possible implementations and aspects of the benefit facilitation component 960 are described more fully below.

As shown in FIG. 20, the benefit facilitation component 960 may also include one or more I/O devices 912 (e.g. antennas, ports, etc.), processors 914, circuitry 916 (e.g. ASICs, signal conditioning, etc.), or storage devices 918. Again, although the portions and components of the benefit facilitation component 960 are depicted in FIG. 20 as being separate portions and components for the sake of clarity, it should be appreciated that these portions and components are not necessarily separate, and may variously be combined or may have overlapping portions, components, or functionalities.

Figure 21:
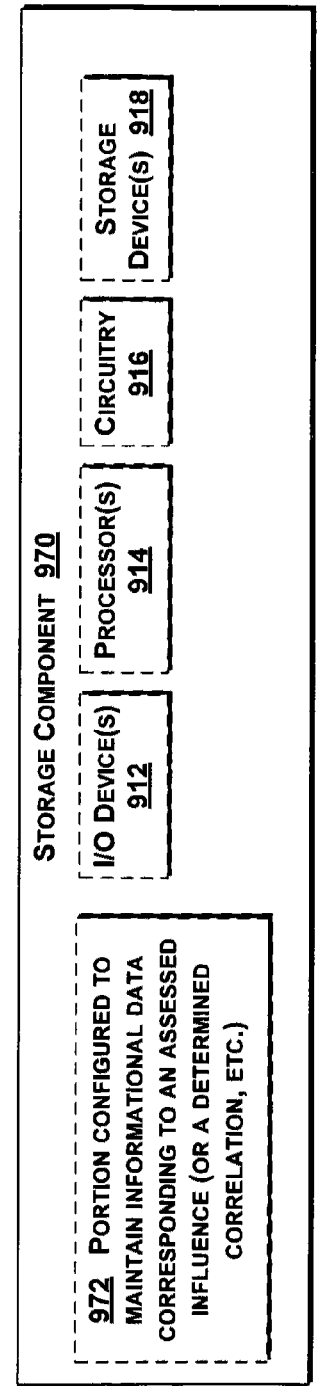

FIG. 21 shows an exemplary implementation of the storage component 970 of FIG. 16. In some implementations, the storage component 970 may include a portion 972 configured to maintain informational data corresponding to the assessed influence, or information relevant to the assessed influence (e.g. a determined correlation, etc.). In addition, further possible implementations and aspects of the storage component 970 are described more fully below.

As shown in FIG. 21, the storage component 970 may also include one or more I/O devices 912 (e.g. antennas, ports, etc.), processors 914, circuitry 916 (e.g. ASICs, signal conditioning, etc.), or storage devices 918. Again, although the portions and components of the storage component 970 are depicted in FIG. 21 as being separate portions and components for the sake of clarity, it should be appreciated that these portions and components are not necessarily separate, and may variously be combined or may have overlapping portions, components, or functionalities.

It should be appreciated that the exemplary systems and environments described above with reference to FIGS. 1-4 and 15-21 are merely illustrative of a few of the many possible systems and environments in which the teachings of the present disclosure may be implemented, and that the teachings herein are not limited to the particular systems and environments described above.

Conclusion

It should be appreciated that the particular embodiments of systems and processes described herein are merely possible implementations of the present disclosure, and that the present disclosure is not limited to the particular implementations described herein and shown in the accompanying figures. For example, in alternate implementations, certain acts need not be performed in the order described, and may be modified, and/or may be omitted entirely, depending on the circumstances. Moreover, in various implementations, the acts described may be implemented by a computer, controller, processor, programmable device, or any other suitable device, and may be based on instructions stored on one or more computer-readable media or otherwise stored or programmed into such devices. In the event that computer-readable media are used, the computer-readable media can be any available media that can be accessed by a device to implement the instructions stored thereon.

Various methods, systems, and techniques may be described and implemented in the general context of computer-executable instructions, such as program modules, executed by one or more processors or other devices. Generally, program modules include routines, programs, objects, components, data structures, etc. that perform particular tasks or implement particular abstract data types. Typically, the functionality of the program modules may be combined or distributed as desired in various alternate embodiments. In addition, embodiments of these methods, systems, and techniques may be stored on or transmitted across some form of computer readable media.

It may also be appreciated that there may be little distinction between hardware and software implementations of aspects of systems and methods disclosed herein. The use of hardware or software may generally be a design choice representing cost vs. efficiency tradeoffs, however, in certain contexts the choice between hardware and software can become significant. Those having skill in the art will appreciate that there are various vehicles by which processes, systems, and technologies described herein can be effected (e.g., hardware, software, firmware, or combinations thereof), and that a preferred vehicle may vary depending upon the context in which the processes, systems, and technologies are deployed. For example, if an implementer determines that speed and accuracy are paramount, the implementer may opt for a mainly hardware and/or firmware vehicle. Alternatively, if flexibility is paramount, the implementer may opt for a mainly software implementation. In still other implementations, the implementer may opt for some combination of hardware, software, and/or firmware. Hence, there are several possible vehicles by which the processes and/or devices and/or other technologies described herein may be effected, and which may be desired over another may be a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use standard engineering practices to integrate such described devices and/or processes into workable systems having the described functionality. That is, at least a portion of the devices and/or processes described herein can be developed into a workable system via a reasonable amount of experimentation.

The herein described aspects and drawings illustrate different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" (or "operatively connected," or "operatively coupled") to each other to achieve the desired functionality, and any two components capable of being so associated can also be viewed as being "operably couplable" (or "operatively couplable") to each other to achieve the desired functionality. Specific examples of operably couplable include but are not limited to physically mateable and/or physically interacting components and/or wirelessly interactable and/or wirelessly interacting components and/or logically interacting and/or logically interactable components.

Those skilled in the art will recognize that some aspects of the embodiments disclosed herein can be implemented in standard integrated circuits, and also as one or more computer programs running on one or more computers, and also as one or more software programs running on one or more processors, and also as firmware, as well as virtually any combination thereof. It will be further understood that designing the circuitry and/or writing the code for the software and/or firmware could be accomplished by a person skilled in the art in light of the teachings and explanations of this disclosure.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. For example, in some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

As a further example of "open" terms in the present specification and claims, it will be understood that usage of a language construction "A or B" is generally interpreted as a non-exclusive "open term" meaning: A alone, B alone, and/or A and B together.

Although various features have been described in considerable detail with reference to certain preferred embodiments, other embodiments are possible. Therefore, the spirit or scope of the appended claims should not be limited to the description of the embodiments contained herein.

What is claimed is:
1. An influence determination method, comprising:
   receiving an access information indicative of an accessing of an electronic accessed content by an accessor, the electronic accessed content including at least a first electronic content and a second electronic content;
   receiving an involvement information indicative of an involvement between the accessor and a third party, wherein at least one of receiving the access information or receiving the involvement information includes receiving using a machine-implemented Web 2.0 construct;

determining a determined influence of the electronic accessed content on the involvement between the accessor and the third party based at least partially on the access information and the involvement information, the determining a determined influence including:

analyzing a first size of one or more electronic documents of the accessor prior to the accessing of the electronic accessed content;

analyzing a second size of the one or more electronic documents subsequent to the accessing of the electronic accessed content;

determining a difference in size of the one or more electronic documents of the accessor prior to and subsequent to the accessing of the electronic accessed content; and correlating at least the difference in size with an assumed influence; and facilitating delivery of a first benefit to an owner of the first electronic content and a second benefit to an owner of the second electronic content in response to at least the determined influence by the first electronic content and the second electronic content on the involvement between the accessor and the third-party, a difference between the first benefit and the second benefit responsive to an evaluation of an influence of the first electronic content and an evaluation of an influence of the second electronic content.

2. The method of claim 1, wherein determining a determined influence of the electronic accessed content on the involvement between the accessor and the third party based at least partially on the access information and the involvement information comprises:

determining an influence of a product-related electronic content on a purchase between a consumer and a product supplier based at least partially on the access information and the involvement information.

3. The method of claim 1, wherein determining a determined influence of the electronic accessed content on the involvement between the accessor and the third party based at least partially on the access information and the involvement information comprises:

analyzing a first activity of the accessor prior to the accessing of the electronic accessed content;

analyzing a second activity of the accessor subsequent to the accessing of the electronic accessed content; and correlating the analysis of the first activity with the analysis of the second activity.

4. The method of claim 1, wherein determining a determined influence of the electronic accessed content on the involvement between the accessor and the third party based at least partially on the access information and the involvement information comprises:

correlating an assumed influence of the electronic accessed content with an initial instance of a product identity in an information residing on an electronic device of the accessor.

5. The method of claim 1, wherein determining a determined influence of the electronic accessed content on the involvement between the accessor and the third party based at least partially on the access information and the involvement information comprises:

correlating one or more aspects of a product-related portion of the electronic accessed content accessed by the accessor with an activity associated with a purchase of a product.

6. The method of claim 1, wherein determining a determined influence of the electronic accessed content on the involvement between the accessor and the third party based at least partially on the access information and the involvement information comprises:

correlating at least one of a privately-available information or a publicly-available information with an activity indicative of a purchase.

7. The method of claim 6, wherein correlating at least one of a privately-available information or a publicly-available information with an activity indicative of a purchase comprises:

correlating at least one of an internet browsing history, a cache history, an electronic mail history, a credit card history, a bank account history, or an electronic document development with an activity indicative of a purchase.

8. The method of claim 6, wherein correlating at least one of a privately-available information or a publicly-available information with an activity indicative of a purchase comprises:

correlating at least one of a privately-available information or a publicly-available information with at least one of an internet browsing history, a cache history, an electronic mail history, a credit card history, a bank account history, an electronic document development, or a product registration activity.

9. The method of claim 1, wherein determining a determined influence of the electronic accessed content on the involvement between the accessor and the third party based at least partially on the access information and the involvement information comprises:

determining the determined influence using a determination component operating on an electronic device of the accessor.

10. The method of claim 1, wherein determining a determined influence of the electronic accessed content on the involvement between the accessor and the third party based at least partially on the access information and the involvement information comprises:

determining the determined influence using an Ajax application operating on an electronic device of the accessor.

11. The method of claim 1, wherein determining a determined influence of the electronic accessed content on the involvement between the accessor and the third party based at least partially on the access information and the involvement information comprises:

determining the determined influence using a determination component operating on an electronic device of the accessor and operable to render an interface accessible to the accessor.

12. The method of claim 1, wherein determining a determined influence of the electronic accessed content on the involvement between the accessor and the third party based at least partially on the access information and the involvement information comprises:

determining the determined influence using a determination component operating on an electronic device of the accessor and operable to communicate with a server that hosts the electronic accessed content.

13. The method of claim 1, wherein determining a determined influence of the electronic accessed content on the involvement between the accessor and the third party based at least partially on the access information and the involvement information comprises:

determining the determined influence using an assessment component operating on an electronic device of a provider of the electronic accessed content.

14. The method of claim 1, wherein determining a determined influence of the electronic accessed content on the involvement between the accessor and the third party based at least partially on the access information and the involvement information comprises:

determining a correlation between a first communication between a content site and a computing device responsive to a human user input, and a second communication between the computing device and a beneficiary site.

15. The method of claim 14, wherein determining a correlation between a first communication between a content site and a computing device responsive to a human user input, and a second communication between the computing device and a beneficiary site comprises:

determining at least one of a linear correlation, a relationship, a non-linear correlation, a fuzzy correlation, and/or a fuzzy relationship between the first communication and the second communication.

16. The method of claim 1, wherein determining a determined influence of the electronic accessed content on the involvement between the accessor and the third party based at least partially on the access information and the involvement information comprises:

determining a first influence of a first electronic accessed content on the involvement between the accessor and the third party; and determining a second influence of a second electronic accessed content on the involvement between the accessor and the third party.

17. The method of claim 1, wherein determining a determined influence of the electronic accessed content on the involvement between the accessor and the third party based at least partially on the access information and the involvement information comprises:

determining a first influence of a first portion of the electronic accessed content on the involvement between the accessor and the third party; and determining a second influence of a second portion of the electronic accessed content on the involvement between the accessor and the third party.

18. The method of claim 1, wherein determining a determined influence of the electronic accessed content on the involvement between the accessor and the third party based at least partially on the access information and the involvement information comprises:

determining a first influence of a first portion of the electronic accessed content provided by a first provider on the involvement between the accessor and the third party provided; and determining a second influence of a second portion of the electronic accessed content provided by a second provider on the involvement between the accessor and the third party.

19. The method of claim 1, wherein determining a determined influence of the electronic accessed content on the involvement between the accessor and the third party based at least partially on the access information and the involvement information comprises:

determining a first novelty attributable to a first electronic accessed content; and determining a second novelty attributable to a second electronic accessed content.

20. The method of claim 1, wherein determining a determined influence of the electronic accessed content on the involvement between the accessor and the third party based at least partially on the access information and the involvement information comprises:

anonymizing at least one of the access information, the involvement information, and/or the assessed influence.

21. The method of claim 1, wherein receiving an access information indicative of an accessing of an electronic accessed content by an accessor, the electronic accessed content including at least a first electronic content and a second electronic content comprises:

receiving data indicative of an accessor accessing at least one of a first network-available electronic content having a first electronic-content portion or a second network-available electronic content having a second electronic-content portion.

22. The method of claim 1, wherein receiving an access information indicative of an accessing of an electronic accessed content by an accessor, the electronic accessed content including at least a first electronic content and a second electronic content comprises:

receiving data indicative of an accessor accessing at least one of a first network-available electronic content having a first electronic-content portion relevant to the third-party or a second network-available electronic content having a second electronic-content portion relevant to the third-party.

23. The method of claim 1, wherein receiving an involvement information indicative of an involvement between the accessor and a third party, wherein at least one of receiving the access information or receiving the involvement information includes receiving using a machine-implemented Web 2.0 construct comprises:

receiving data indicative of at least one of an activity, interaction, purchase, vote, contribution, and/or relationship between the accessor and the third-party.

24. The method of claim 1, wherein receiving an involvement information indicative of an involvement between the accessor and a third party, wherein at least one of receiving the access information or receiving the involvement information includes receiving using a machine-implemented Web 2.0 construct comprises:

receiving data useable in inferring an involvement between the accessor and the third-party.

25. The method of claim 1, wherein receiving an involvement information indicative of an involvement between the accessor and a third party, wherein at least one of receiving the access information or receiving the involvement information includes receiving using a machine-implemented Web 2.0 construct comprises:

receiving an involvement information using a web service.

26. The method of claim 1, wherein receiving an involvement information indicative of an involvement between the accessor and a third party, wherein at least one of receiving the access information or receiving the involvement information includes receiving using a machine-implemented Web 2.0 construct comprises:

receiving an involvement information using an Ajax (Asynchronous JavaScript and XML (Extensible Markup Language)) application.

27. The method of claim 1, wherein receiving an involvement information indicative of an involvement between the accessor and a third party, wherein at least one of receiving the access information or receiving the involvement information includes receiving using a machine-implemented Web 2.0 construct comprises:

receiving an involvement information using a Flash application.

28. The method of claim 1, wherein receiving an involvement information indicative of an involvement between the accessor and a third party, wherein at least one of receiving the access information or receiving the involvement information includes receiving using a machine-implemented Web 2.0 construct comprises:

receiving an involvement information using a mashup that includes the electronic accessed content and at least one of a web service, an Ajax application, a Flash application, an electronic content, or another electronic accessed content.

29. The method of claim 1, wherein receiving an involvement information indicative of an involvement between the accessor and a third party, wherein at least one of receiving the access information or receiving the involvement information includes receiving using a machine-implemented Web 2.0 construct comprises:

receiving an involvement information using an open-source machine-implemented Web 2.0 construct.

30. The method of claim 1, wherein receiving an access information indicative of an accessing of an electronic accessed content by an accessor, the electronic accessed content including at least a first electronic content and a second electronic content comprises:

receiving an access information indicative of an accessing of a machine-implemented Web 2.0 construct by an accessor.

31. The method of claim 30, wherein receiving an access information indicative of an accessing of a machine-implemented Web 2.0 construct by an accessor comprises:

receiving an access information indicative of an accessing of a web service by an accessor.

32. The method of claim 30, wherein receiving an access information indicative of an accessing of a machine-implemented Web 2.0 construct by an accessor comprises:

receiving an access information indicative of an accessing of an Ajax (Asynchronous JavaScript and XML (Extensible Markup Language)) application by an accessor.

33. The method of claim 30, wherein receiving an access information indicative of an accessing of a machine-implemented Web 2.0 construct by an accessor comprises:

receiving an access information indicative of an accessing of a Flash application by an accessor.

34. The method of claim 30, wherein receiving an access information indicative of an accessing of a machine-implemented Web 2.0 construct by an accessor comprises:

receiving an access information indicative of an accessing of a Web 2.0 electronic content by an accessor.

35. The method of claim 1, wherein receiving an access information indicative of an accessing of an electronic accessed content by an accessor, the electronic accessed content including at least a first electronic content and a second electronic content comprises:

receiving an access information using a component operating on an electronic device of the accessor.

36. The method of claim 1, wherein receiving an access information indicative of an accessing of an electronic accessed content by an accessor, the electronic accessed content including at least a first electronic content and a second electronic content comprises:

receiving an access information using a component operating on an electronic device of a provider of the electronic accessed content.

37. The method of claim 1, wherein receiving an access information indicative of an accessing of an electronic accessed content by an accessor, the electronic accessed content including at least a first electronic content and a second electronic content comprises:

receiving an access information from an engine loaded locally relative to the accessor.

38. The method of claim 1, wherein receiving an access information indicative of an accessing of an electronic accessed content by an accessor, the electronic accessed content including at least a first electronic content and a second electronic content comprises:

receiving an access information via an Ajax application loaded locally relative to the accessor.

39. The method of claim 1, wherein receiving an access information indicative of an accessing of an electronic accessed content by an accessor, the electronic accessed content including at least a first electronic content and a second electronic content comprises:

receiving an access information via an engine operable to render an interface accessible to the accessor.

40. The method of claim 1, wherein receiving an access information indicative of an accessing of an electronic accessed content by an accessor, the electronic accessed content including at least a first electronic content and a second electronic content comprises:

receiving an access information via an engine operable to communicate with a server that hosts the electronic accessed content.

41. The method of claim 1, wherein the determining a determined influence of the electronic accessed content on the involvement between the accessor and the third party based at least partially on the access information and the involvement information comprises:

determining whether a content from a site providing a comparison of various sizes of different models of an item was the primary reason a consumer purchased the item.

42. The method of claim 41, wherein the determining whether a content from a site providing a comparison of various sizes of different models of an item was the primary reason a consumer purchased the item comprises:

analyzing a length of time the consumer spent browsing the site providing the comparison of various sized of different models of the item.

43. The method of claim 41, wherein the determining whether a content from a site providing a comparison of various sizes of different models of an item was the primary reason a consumer purchased the item comprises:

analyzing contents of a file on the consumer's electronic device, the file containing notes taken by the user regarding the item, the notes including content from the site.

44. The method of claim 43, wherein the determining whether a content from a site providing a comparison of various sizes of different models of an item was the primary reason a consumer purchased the item comprises:

correlating an increase in size of the file containing notes during a browsing session during which the user accessed the site with a determination that the site was influential in the purchase decision.

45. The method of claim 44, wherein the analyzing and correlating steps are performed by a determination process running on the consumer's electronic device.

46. The method of claim 1, wherein the determining a determined influence of the electronic accessed content on the involvement between the accessor and the third party based at least partially on the access information and the involvement information comprises:
    determining an influence of a first website and an influence of a second website on a consumer's purchase decision.

47. The method of claim 46, wherein the determining an influence of a first website and an influence of a second website on a consumer's purchase decision comprises:
    detecting a first amount of time spent by a consumer browsing a first website, detecting a second amount of time spent by a consumer browsing a second website, and determining the website on which the browser spent the most time browsing the site was the website most influential on a consumer's purchase decision.

48. The method of claim 47, comprising:
    facilitating a benefit to the website most influential on a consumer's purchase decision.

49. The method of claim 48, comprising:
    facilitating a discount on a future purchase to an author of a consumer report on the website most influential on a consumer's purchase decision.

50. The method of claim 1, wherein the determining a determined influence of the electronic accessed content on the involvement between the accessor and the third party based at least partially on the access information and the involvement information comprises:
    determining a first influence of a first commentator's viewpoint and determining a second influence of a second commentator's viewpoint, the first and second commentators' viewpoints contained within electronic accessed content on a first website and a second website, where an accessor eventually submits a purchase order consistent with either the first viewpoint or the second viewpoint.

51. The method of claim 1, wherein the determining a determined influence of the electronic accessed content on the involvement between the accessor and the third party based at least partially on the access information and the involvement information comprises:
    determining a determined influence of the electronic accessed content on the involvement between the accessor and the third party based at least partially on the access information and the involvement information without revealing any privately-available information used in determining the determined influence.

52. The method of claim 1, wherein the determining a determined influence of the electronic accessed content on the involvement between the accessor and the third party based at least partially on the access information and the involvement information is logic included in an electronic platform provided by a supplier of the electronic platform.

53. An influence determination apparatus, comprising:
    means for receiving an access information indicative of an accessing of an electronic accessed content by an accessor, the electronic accessed content including at least a first electronic content and a second electronic content;
    means for receiving an involvement information indicative of an involvement between the accessor and a third party, wherein at least one of means for receiving the access information or means for receiving the involvement information includes means for receiving using a machine-implemented Web 2.0 construct;
    means for determining a determined influence of the electronic accessed content on the involvement between the accessor and the third party based at least partially on the access information and the involvement information, the determining a determined influence including:
        analyzing a first size of one or more electronic documents of the accessor prior to the accessing of the electronic accessed content;
        analyzing a second size of the one or more electronic documents subsequent to the accessing of the electronic accessed content;
        determining a difference in size of the one or more electronic documents of the accessor prior to and subsequent to the accessing of the electronic accessed content; and
        correlating at least the difference in size with an assumed influence; and
    means for facilitating delivery of a first benefit to an owner of the first electronic content and a second benefit to an owner of the second electronic content in response to at least the determined influence by the first electronic content and the second electronic content on the involvement between the accessor and the third-party, a difference between the first benefit and the second benefit responsive to an evaluation of an influence of the first electronic content and an evaluation of an influence of the second electronic content.

54. A system, comprising:
    circuitry for receiving an access information indicative of an accessing of an electronic accessed content by an accessor, the electronic accessed content including at least a first electronic content and a second electronic content;
    circuitry for receiving an involvement information indicative of an involvement between the accessor and a third party, wherein at least one of circuitry for receiving the access information or circuitry for receiving the involvement information includes circuitry for receiving using a machine-implemented Web 2.0 construct;
    circuitry for determining a determined influence of the electronic accessed content on the involvement between the accessor and the third party based at least partially on the access information and the involvement information, the determining a determined influence including:
        analyzing a first size of one or more electronic documents of the accessor prior to the accessing of the electronic accessed content;
        analyzing a second size of the one or more electronic documents subsequent to the accessing of the electronic accessed content;
        determining a difference in size of the one or more electronic documents of the accessor prior to and subsequent to the accessing of the electronic accessed content; and
        correlating at least the difference in size with an assumed influence; and
    circuitry for facilitating delivery of a first benefit to an owner of the first electronic content and a second benefit to an owner of the second electronic content in response to at least the determined influence by the first electronic content and the second electronic content on the involvement between the accessor and the third-party, a difference between the first benefit and the second benefit responsive to an evaluation of an influence of the first electronic content and an evaluation of an influence of the second electronic content.

* * * * *